US009183264B2

(12) United States Patent
Wada et al.

(10) Patent No.: US 9,183,264 B2
(45) Date of Patent: Nov. 10, 2015

(54) DISTRIBUTED CONFIGURATION INFORMATION MANAGEMENT DEVICE AND DISTRIBUTED CONFIGURATION INFORMATION MANAGEMENT METHOD USING DUPLICATES

(75) Inventors: Yuji Wada, Kawasaki (JP); Masazumi Matsubara, Kawasaki (JP); Hiroshi Otsuka, Kawasaki (JP); Shinya Kitajima, Kawasaki (JP); Yukihiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 748 days.

(21) Appl. No.: 12/929,904

(22) Filed: Feb. 23, 2011

(65) Prior Publication Data

US 2011/0231429 A1 Sep. 22, 2011

(30) Foreign Application Priority Data

Mar. 17, 2010 (JP) .................. 2010-061449

(51) Int. Cl.
*G06F 17/30* (2006.01)
*G06F 9/445* (2006.01)
*G06F 12/06* (2006.01)

(52) U.S. Cl.
CPC ...... *G06F 17/30566* (2013.01); *G06F 9/44505* (2013.01); *G06F 12/0646* (2013.01)

(58) Field of Classification Search
CPC .......... G06F 17/30566; G06F 12/0646; G06F 9/44505
USPC ......................................... 707/634
See application file for complete search history.

(56) References Cited

U.S. PATENT DOCUMENTS

| 6,694,306 | B1 | 2/2004 | Nishizawa et al. |
| 2002/0099787 | A1* | 7/2002 | Bonner et al. ................. 709/216 |
| 2005/0076070 | A1* | 4/2005 | Mikami ......................... 707/204 |
| 2007/0088977 | A1* | 4/2007 | Eguchi et al. ...................... 714/6 |

FOREIGN PATENT DOCUMENTS

| JP | 2002-500791 | 1/2002 |
| WO | 98/54659 | 12/1998 |
| WO | 99/17203 | 4/1999 |
| WO | 2010/073316 A1 | 7/2010 |

OTHER PUBLICATIONS

Alexander Keller, et al., "Best Practices for Deploying a CMDB in large-scale Enviroments", Subramanian S. IFIP/IEEE International Symposium on Intergrated Network Management, Jun. 1-5, 2009, pp. 732-745.
United Kingdom Search Report issued Jun. 24, 2011 in corresponding United Kingdom Patent Application GB1103284.4.

* cited by examiner

*Primary Examiner* — Leslie Wong
(74) *Attorney, Agent, or Firm* — Staas & Halsey LLP

(57) ABSTRACT

In the configuration information management device, if a CI stored in the entity information storage unit has a feature, duplicates of the CIs that are associated with the subject CI, managed by other FCMDBs, and do not have features, as well as duplicates of Rels, are created and managed in the entity information storage unit. In the configuration information management device, when a search request for a search formula that associates CIs with one another by Rels is received, the information about the search formula is searched for with the use of the duplicates created in the entity information storage unit.

6 Claims, 24 Drawing Sheets

FIG.5

FEATURE INFORMATION STORAGE UNIT 12

| CI CLASSIFI-CATION (12a) | TOTAL NUMBER (12b) | TOTAL ATTRIBUTE NUMBER (12c) | FEATURE EXISTENCE COLUMN (12d) |
|---|---|---|---|
| App | 3 | 18 | NONE |
| Rel | 5 | 5 | NONE |
| Sto | 2 | 10 | NONE |
| Svr | 2 | 40 | FEATURE EXISTS |

| DIVISIONAL SEARCH FORMULA 1 | %Server[record/status='error']/&ManagedBy/%Person/record/tel |
|---|---|
| DIVISIONAL SEARCH FORMULA 2 | %Server[record/status='error']/&Installed/%Application/record/name |

FIG.22B (RELATED ART)

| DIVISIONAL SEARCH FORMULA 1 | %Server[record/status='error']/&ManagedBy/%Person/record/tel |
|---|---|
| DIVISIONAL SEARCH FORMULA 2 | %Server[record/status='error']/&Installed/%Application/record/name |

DISTRIBUTED CONFIGURATION INFORMATION MANAGEMENT DEVICE AND DISTRIBUTED CONFIGURATION INFORMATION MANAGEMENT METHOD USING DUPLICATES

CROSS-REFERENCE TO RELATED APPLICATION

This application is based upon and claims the benefit of priority of the prior Japanese Patent Application No. 2010-061449, filed on Mar. 17, 2010, the entire contents of which are incorporated herein by reference.

FIELD

The embodiment discussed herein is directed to a configuration information management device, a configuration information management program, and a configuration information management method.

BACKGROUND

An information system is formed by various resources such as hardware, software, and a network, and a respective resources function in an organically integrated manner, to meet operation objectives as a system.

Federated Configuration Management Database (FCMDB) has been known as a database (DB) that virtually integrate several kinds of DBs that manage information about the various resources forming an information system.

Referring now to FIG. 24, a concept of such a FCMDB is described. In the example illustrated in FIG. 24, the FCMDB virtually integrates different kinds of DBs such as an configuration information DB, a trouble information DB and change information DB, which form an information system. Therefore, the FCMDB manages the respective resources so as to represent a graph having information about the resources as nodes (CIs: Configuration Items), and relationships between the CIs as edges. In this manner, cross-cutting operations can be performed on the virtually integrated DBs. The installed form of each DB is called a Management Data Repository (MDR).

It is also known that FCMDBs form a distributed structure to improve scalability. Referring now to FIG. 25, the concept of such a distributed FCMDB is described. In the example illustrated in FIG. 25, $CI_1$ through $CI_3$, and the relationships $R_1$ and $R_2$ among the CIs are managed in a distributed manner by FCMDBs in the distributed FCMDB.

Patent Document 1: Japanese National Publication of International Patent Application No. 2002-500791

When a search operation is performed by tracing the relationships R in the above described distributed FCMDB, however, a partial search operation needs to be performed repeatedly, and a high-speed search operation may not be performed. That is, the respective CIs and the respective relationships R are registered in the respective FCMDBs placed in a distributed manner in the distributed FCMDB. Therefore, when a search operation is performed by tracing the relationships R, many operations need to be performed across the FCMDBs.

Referring now to FIG. 26, the problem with a search operation in such a distributed FCMDB is described. FIG. 26 is a diagram for explaining a search operation in a distributed FCMDB. A case where the information about $CI_2$ associated with $CI_1$, by $R_1$ and the information about $CI_3$ associated with $CI_2$ by $R_2$ are retrieved from a distributed FCMDB is illustrated in FIG. 26.

In a first partial search operation, the distributed FCMDB searches a FCMDB1 for $CI_1$ in a first partial search operation, and obtains an identification ID of $CI_1$. In a second partial search operation, the distributed FCMDB searches a FCMDB2 for $R_1$ having the identification ID of $CI_1$ as one of a source CI and a target CI connected to both ends of the relationship R, and then obtains the identification ID of $CI_2$ at the other end. In a third partial search operation, the distributed FCMDB further searches a FCMDB3 for $R_2$ having the identification ID of $CI_2$ as one of the source CI and the target CI connected to both ends of the relationship R, and obtains the identification ID of $CI_3$ at the other end. In a fourth partial search operation, the distributed FCMDB searches the FCMDB2 for the information about $CI_3$, using the identification ID of $CI_3$.

SUMMARY

According to an aspect of an embodiment of the invention, a configuration information management device includes a storage unit that stores a configuration item managed by the device and an item relationship, with respect to configuration items related to a system and item relationships that associate the configuration items with one another, the configuration items and the item relationships being distributed in a plurality of devices; a management unit that, when a first configuration item stored in the storage unit has a feature, creates duplicates of second configuration items that are associated with the first configuration item, do not have a feature and are managed by other devices and duplicates of relationships between the first configuration item and the second configuration items, the duplicates being created in the storage unit; and a search unit that, upon receipt of a search request for configuration information that associates the configuration items with one another by the item relationships, searches for the information about the configuration information with the use of the duplicates created in the storage unit.

According to another aspect of an embodiment of the invention, a configuration information management method creating duplicates of second configuration items that are associated with a first configuration item and relationships between the first configuration item and the second configuration items when a first configuration has a feature, the configuration items and the item relationships being distributed in a plurality of devices, the second configuration items not having the feature and being managed by other devices; and searching for the information about the configuration information with the use of the duplicates created in a device upon receipt of a search request for configuration information that associates the configuration items with one another by the item relationships.

According to still another aspect of an embodiment of the invention, a computer-readable recording medium stores therein a computer program that causes a computer to implement the above method.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a diagram illustrating an example of the data structure of the feature information storage unit;

FIGS. 22A and 22B are diagrams illustrating an example of the division into divisional search formulas with the use of the configuration information management device;

DESCRIPTION OF EMBODIMENTS

Preferred embodiments of the present invention will be explained with reference to accompanying drawings. It is noted that the present invention is not limited to the embodiments, and may be applied to any distributed FCMDBs.

[a] First Embodiment

Figure 1:
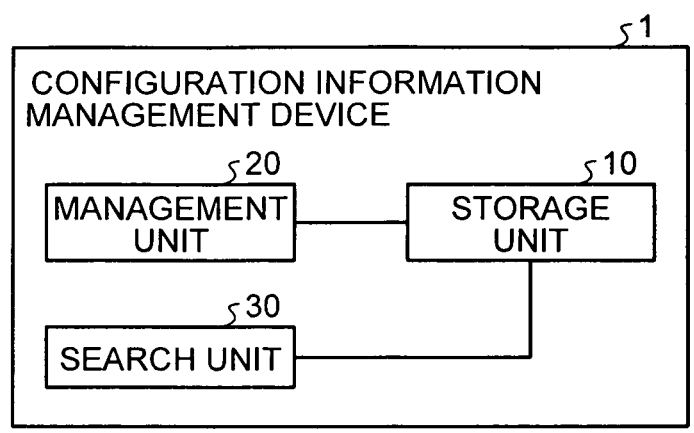
FIG. 1 is a functional block diagram illustrating the structure of a configuration information management device according to a first embodiment.

FIG. 1 is a functional block diagram illustrating the structure of a configuration information management device according to a first embodiment. As illustrated in FIG. 1, a configuration information management device 1 includes a storage unit 10, a management unit 20, and a search unit 30.

The storage unit 10 stores the configuration items managed by its own device and item relationships managed by its own device, with respect to the item relationships that are distribution-managed by devices and associate the configuration items related to the system with the item relationships related to the system. Distributed FCMDBs are mounted on the respective devices, and the configuration information related to the computing system managed by its own device is stored in each FCMDB. The configuration information is represented by a graph that has configuration items as nodes, and the item relationships among the configuration items as edges. That is, the item relationships define the relationship between each two configuration items. For example, the configuration items include a server, a storage, and software, which are configuration items of a computing system, and the item relationships define the relationship between each two of the configuration items.

Hereinafter, a configuration item that has a feature is referred to a feature configuration item and a configuration item that does not have a feature is referred to a featureless configuration item. When the configuration items stored in the storage unit 10 are feature configuration items, the management unit 20 creates duplicates of featureless configuration items among the configuration items associated with the feature configuration items and managed by the other devices, as well as duplicates of the item relationships. The management unit 20 manages those duplicates in the storage unit 10.

The search unit 30 receives a search request for the configuration information associating configuration items with one another by the item relationships, and searches for the information about the configuration information with the use of the duplicates created in the storage unit 10.

Figure 2:
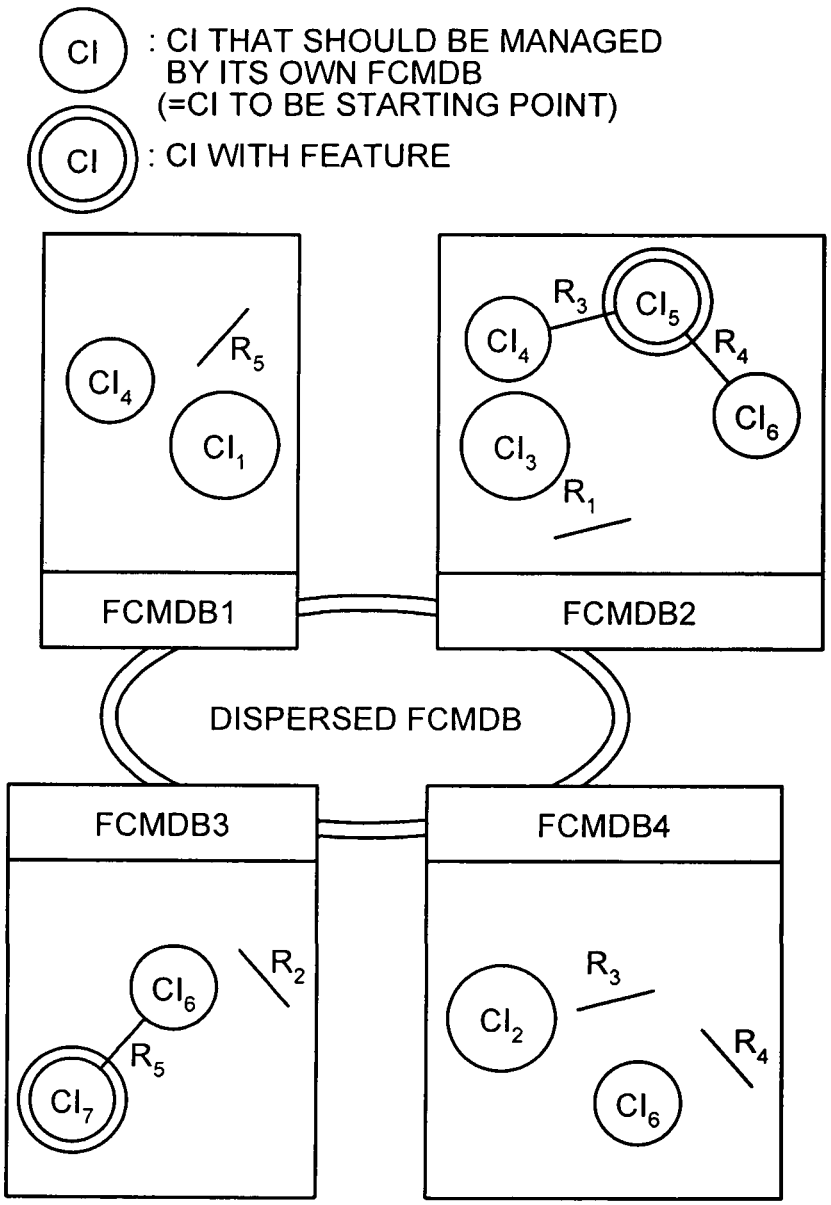
FIG. 2 is a diagram for explaining the states of configuration items.

Referring now to FIG. 2, status examples of the configuration items managed by the management unit 20 of the configuration information management device 1 according to the first embodiment. FIG. 2 is a diagram for explaining the states of the configuration items managed by the management unit 20 of the configuration information management device 1.

As illustrated in FIG. 2, each of the FCMDBs 1 through 4 forming the distributed FCMDB stores the configuration item (CI) and the item relationships (R) managed by its own FCMDB. Further, in a case where the configuration items managed by its own FCMDB are feature configuration items, each of the FCMDBs 1 through 4 creates duplicates of featureless configuration items among the feature configuration items managed by the other FCMDBs, as well as duplicates of the item relationships. Those duplicates are stored in each storage unit 10. For example, the FCMDB2 creates a duplicate of a featureless configuration item $CI_4$ that is associated with a feature configuration item $CI_5$ managed by its own FCMDB2 and is managed by the FCMDB1, as well as a duplicate of an item relationship $R_3$. Those duplicates are stored in the storage unit 10 of the FCMDB2. Further, the FCMDB2 creates a duplicate of a featureless configuration item $CI_6$ that is associated with a feature configuration item $CI_5$ managed by its own FCMDB2 and is managed by the FCMDB4, as well as a duplicate of an item relationship $R_4$. Those duplicates are stored in the storage unit 10 of the FCMDB2.

In the above described manner, the configuration information management device 1 creates duplicates of featureless configuration items that are associated with feature configuration items and are managed by other devices. Those duplicates are managed in the same storage unit 10. Accordingly, when the configuration information management device 1 searches for information by tracing configuration items, the amount of search operation across devices can be reduced, compared with the amount of search operation in a case where configuration items are stored in the respective devices independently of one another, and the search operation can be performed at higher speeds. Moreover, a feature configuration item exists at the starting point of configuration items to be duplicated. Accordingly, there is a higher probability that the starting point of the configuration items to be duplicated matches the starting point of each search operation, and the search efficiency can be made even higher.

[b] Second Embodiment

Figure 3:
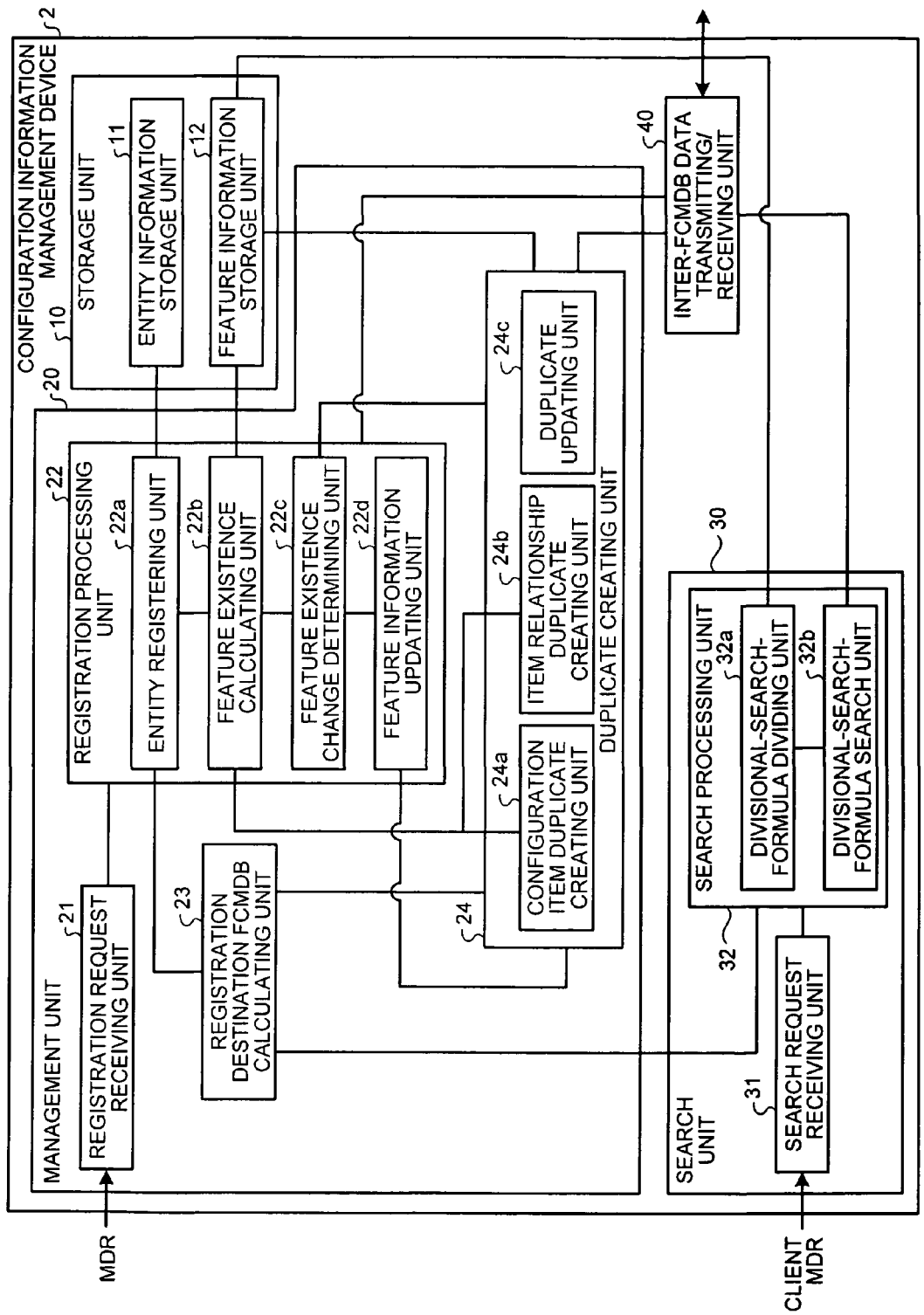
FIG. 3 is a functional block diagram illustrating the structure of a configuration information management device according to a second embodiment.

Structure of the Configuration Information Management Device According to the Second Embodiment FIG. 3 is a functional block diagram illustrating the structure of a configuration information management device 2 according to a second embodiment. The configuration information management device 2 includes the storage unit 10, the management unit 20, the search unit 30, and the inter-FCMDB data transmitting/receiving unit 40. The management unit 20 includes a registration request receiving unit 21, a registration processing unit 22, a registration destination FCMDB calculating unit 23, and a duplicate creating unit 24. The search unit 30 includes a search request receiving unit 31 and a search processing unit 32. The registration processing unit 22 includes an entity registering unit 22a, a feature existence calculating unit 22b, a feature existence change determining unit 22c, and a feature information updating unit 22d. The duplicate creating unit 24 includes a configuration item duplicate creating unit 24a, an item relationship duplicate creating unit 24b, and a duplicate updating unit 24c. The search processing unit 32 includes a divisional-search-formula dividing unit 32a and a divisional-search-formula search unit 32b.

It is noted that the management unit 20 and the search unit 30 may be integrated circuits such as Application Specific Integrated Circuits (ASICs) or Field Programmable Gate Arrays (FPGA), or electronic circuits such as Central Processing units (CPUs) or Micro Processing Units (MPU), for example.

The storage unit 10 includes an entity information storage unit 11 and a feature information storage unit 12. It is noted that the storage unit 10 may be a semiconductor memory element such as a Random Access Memory (RAM) or a flash memory, or a storage device such as a hard disk or an optical disk.

The entity information storage unit 11 stores the configuration items and item relationships managed by its own device, with respect to the item relationships that are distribution-managed by devices and associate the configuration items related to the system with the item relationships related to the system. Where registered configuration items include configuration items having features, the entity information storage unit 11 stores the featureless configuration items that are associated with the configuration items and are managed not only by its own device but also the other devices, as well as the item relationships. It is noted that configuration items and configuration relationships are called entities, and data about the configuration items and configuration relationships are called entity information.

Figure 4:
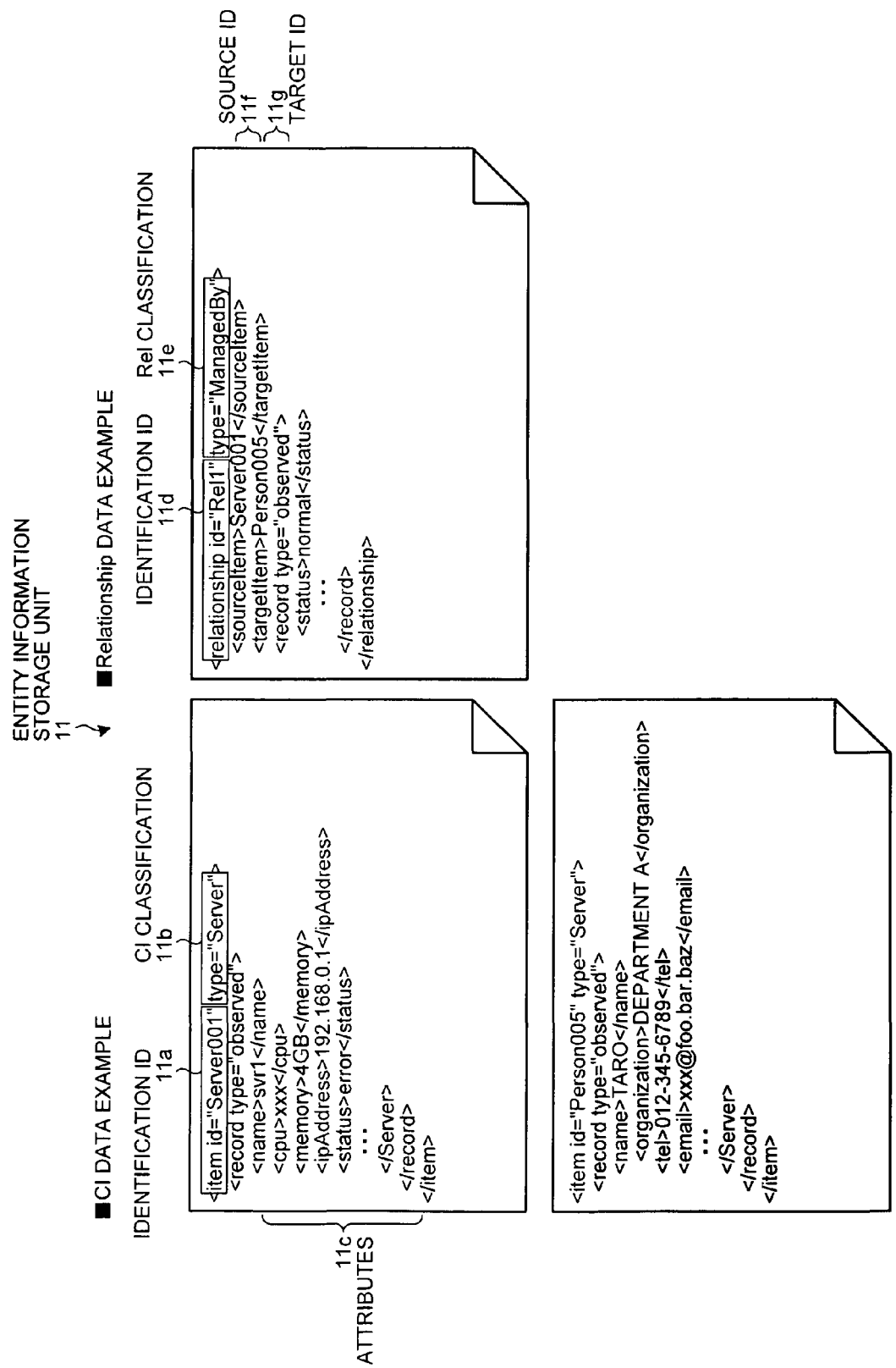
FIG. 4 is a diagram illustrating an example of the data structure in the entity information storage unit.

Referring now to FIG. 4, the entity information storage unit 11 is described. FIG. 4 is a diagram illustrating an example of the data structure of the entity information storage unit 11. As illustrated in FIG. 4, the entity information storage unit 11 stores configuration item (CI) data and item relationship (Relationship) data. The CI data indicates the information about the components constituting an information system, such as a server, a storage, or software. The CI data stores each CI associated with an identification id 11a indicating the identification character unique to the CI, a CI classification 11b indicating the classification of the CI, and an attribute 11c indicating the attributes of the CI. The Relationship (abbreviated as "Rel") data stores each Rel associated with an identification id 11d indicating the identification character unique to the Rel, a Rel classification 11e indicating the classification of the Rel, a source id 11f, and a target id 11g. The source id 11f indicates the CI identification id of one of the CIs associated with each other at both ends, and the target id 11g indicates the CI classification id of the other CI. The source id 11f and the target id 11g are attributes of the Rel.

The CI classification 11b of an example of CI data having the identification id 11a of "Server001" is "Server". The attributes of "Server001" are "$svR_1$" in server name, "xxx" in CPU (cpu), "4 GB" in memory, and "192.168.0.1" in IP address (ipAddress). Also, the Ref classification 11e of an example of Rel data having the identification id 11d of "Rel1" is "Managed By". As the attributes of "Rel1", the source id 11f is "Server001", and the target id 11g is "Person005". That is, "Rel1" associates the CI "Server001" with the CI "Person005".

Referring back to FIG. 3, the feature information storage unit 12 stores the feature information about the respective CI classifications. FIG. 5 is a diagram illustrating an example of the data structure of the feature information storage unit 12. As illustrated in FIG. 5, the feature information storage unit 12 stores each CI classification associated with a CI classification 12a indicating the classification of the CI, a total CI number 12b, a total attribute number 12c, and a feature existence column 12d. The total CI number 12b indicates the total number of CIs belonging to the CI classifications managed by the distributed FCMDB. The total attribute number 12c indicates the total number of attributes of all the CIs belonging to the CI classifications managed by the distributed FCMDB. The feature existence column 12d indicates the existence of the features of the CI classification 12a. If the CI classification 12a has a feature, the feature existence column 12d illustrates "FEATURE EXISTS". If the CI classification 12a has no features, the feature existence column 12d shows "NONE". Where the CI classification 12a is determined to have a feature, the quotient (the average attribute number) obtained by dividing the total attribute number 12c by the total CI number 12b is equal to or greater than a threshold value, for example. In this embodiment, the threshold value is set at "10", for example, but it is not limited to that.

For example, the average attribute numbers of the CI classifications 12a "App", "Rel", and "Sto" are "6", "1", and "5", which are the quotients obtained by dividing the respective total attribute numbers 12c by the respective total CI numbers 12b. Therefore, the respective feature existence columns 12d indicate "NONE". On the other hand, the average attribute number of "Svr" is "20". Accordingly, the feature existence column 12d indicates "FEATURE EXISTS".

Referring back to FIG. 3, upon receipt of a configuration information registration request from a Management Data Repository (MDR), the registration request receiving unit 21 outputs the configuration information requested for registration to the entity registering unit 22a. It is noted that the configuration information is information that associates CIs with one another by Rels.

The entity registering unit 22a acquires the configuration information from the registration request receiving unit 21, and then registers the CIs and Rels contained in the configuration information in the storage units 10 of the respective FCMDBs managing the CIs and Rels. Specifically, the entity registering unit 22a outputs the identification id 11a of each CI contained in the configuration information to the registration destination FCMDB calculating unit 23, and determines the registration destination FCMDB of each CI in accordance with the value calculated by the registration destination FCMDB calculating unit 23. Likewise, the entity registering unit 22a outputs the identification id 11d of each Rel contained in the configuration information to the registration destination FCMDB calculating unit 23, and determines the registration destination FCMDB of each Rel in accordance with the value calculated by the registration destination FCMDB calculating unit 23. The entity registering unit 22a also registers the entity information of each CI and each Rel having its own FCMDB as the determined registration destination FCMDB, in the entity information storage unit 11. The entity registering unit 22a also outputs the entity information of each CI and each Rel not having its own FCMDB as the determined registration destination FCMDB, to the inter-FCMDB data transmitting/receiving unit 40, together with the identification id of the registration destination FCMDB.

The feature existence calculating unit 22b determines whether a CI classification has a feature through a calculation. Specifically, the feature existence calculating unit 22b adds up the attribute numbers of all the CIs of the same CI classifications 12a as the CI classifications 12a that classify CIs, for each CI contained in the configuration information. The feature existence calculating unit 22b also calculates the average attribute number of the CIs belonging to the subject CI classification 12a, from the total attribute number obtained through the addition. The feature existence calculating unit 22b also stores the feature existence column 12d according to the calculated average attribute number, into the feature information storage unit 12. For example, in a case where the average attribute number is "10" or greater, the feature existence calculating unit 22b determines that there is a feature, and stores "FEATURE EXISTS" into the feature existence column 12d. In a case where the average attribute number is smaller than "10", the feature existence calculating unit 22b determines that there are no features, and stores "NONE" into the feature existence column 12d.

Figure 6:
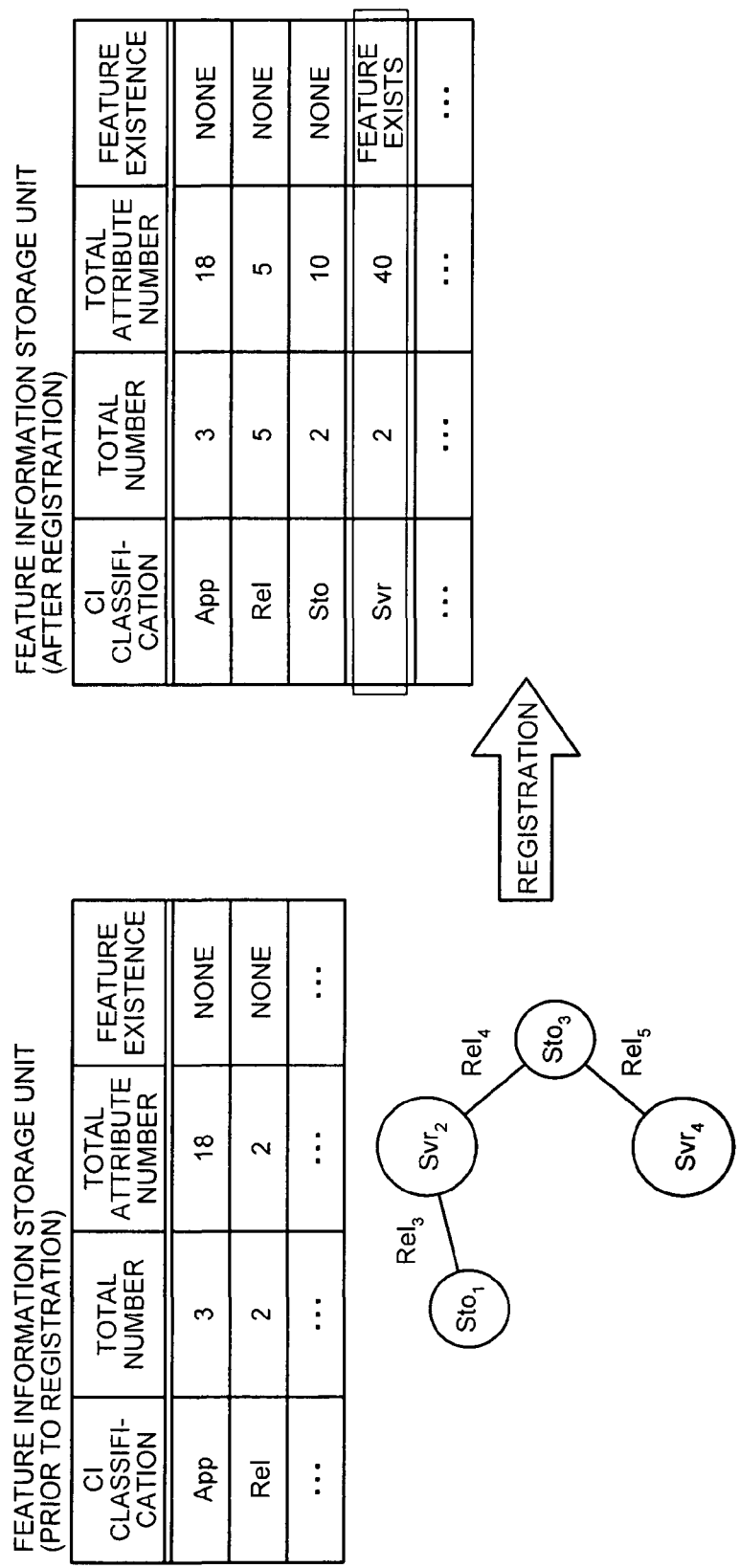
FIG. 6 is a diagram illustrating an example of the feature information storage unit before and after a registration.

Referring now to FIG. 6, an example of the feature information storage unit 12 before and after a registration of configuration information is described. FIG. 6 is a diagram illustrating an example of the feature information storage unit 12 before and after a registration. It is noted that the configuration information contains the CIs of $Sto_1$, $Svr_2$, $Sto_3$, and $Svr_4$. As illustrated in FIG. 6, the feature existence calculating unit 22b stores the feature information about the CI classification "Svr" of "$Svr_2$" and "$Svr_4$" into the feature information storage unit 12. In the example illustrated in FIG. 6, the CI classification "Svr" is not stored in the feature information storage unit 12, prior to the registration of the configuration information. However, the CI classification "Svr" is stored in the feature information storage unit 12 after the registration of the configuration information. That is, since "$Svr_2$" and "$Svr_4$" contained in the configuration information belong to the CI classification "Syr", the total number is stored as "2", and the total attribute number is stored as "40". Also, the feature existence calculating unit 22b calculates the average attribute number of the CIs belonging to the CI classification "Syr" from the total attribute number, and stores the feature existence column "FEATURE EXISTS" according to "20", which is obtained through the calculation, into the feature information storage unit 12.

Referring back to FIG. 3, the feature existence change determining unit 22c determines whether there is a change in the feature existence column of the CI classifications of the CIs contained in the configuration information. Specifically, the feature existence change determining unit 22c determines whether the feature existence column 12d of the CI classification 12a of a CI contained in the configuration information has changed from "NONE" to "FEATURE EXISTS". When determining that the feature existence column 12d of the CI classification 12a of the CI has changed from "NONE" to "FEATURE EXISTS", the feature existence change determining unit 22c requests the duplicate updating unit 24c to perform a duplicate updating operation for all the CIs having the same CI classification as the CI classification 12a.

When determining that the feature existence column 12d of the CI classification 12a of the CI has not changed from "NONE" to "FEATURE EXISTS", the feature existence change determining unit 22c deletes the duplicates of the CIs associated with all the CIs belonging to the same CI classification as the CI classification 12a. Specifically, the feature existence change determining unit 22c deletes the CIs and Rels associated with the CIs belonging to the same CI classification as the CI classification 12a, from the entity information storage unit 11. The feature existence change determining unit 22c also requests the duplicate updating unit 24c to perform a duplicate updating operation for all the CIs belonging to the same CI classification as the CI classification 12a.

When the later described configuration information duplicate creating operation performed by the duplicate creating unit 24, the feature information updating unit 22d updates the feature information storage units 12 of all the FCMDBs other than its own FCMDB.

When obtaining the identification id 11a of a CI or the identification id 11d of a Rel, the registration destination FCMDB calculating unit 23 calculates a value that determines the registration destination FCMDB from the identification id. For example, the registration destination FCMDB calculating unit 23 calculates the hash value corresponding to the identification id, using a hash function. The registration destination FCMDB is determined by the calculated hash value.

The configuration item duplicate creating unit 24a sequentially performs a duplicate creating operation for each of the CIs contained in the configuration information. Specifically, where the CIs contained in the configuration information (the CIs subject to duplicate creating operations) include a CI classification having a feature, the configuration item duplicate creating unit 24a searches for a set of CIs that can be reached tracing Rels from a CI subject to a duplicate creating operation among the CIs contained in the configuration information, and have featureless CI classifications. The configuration item duplicate creating unit 24a also requests the inter-FCMDB data transmitting/receiving unit 40 to create duplicates of the subject CI and the subject Rel existing on the way to CIs contained in the set reached from a CI subject to a duplicate creating operation. The duplicates are created in the FCMDB that manages the CI subject to a duplicate creating operation, or a CI having a CI classification with a feature.

Figure 7:
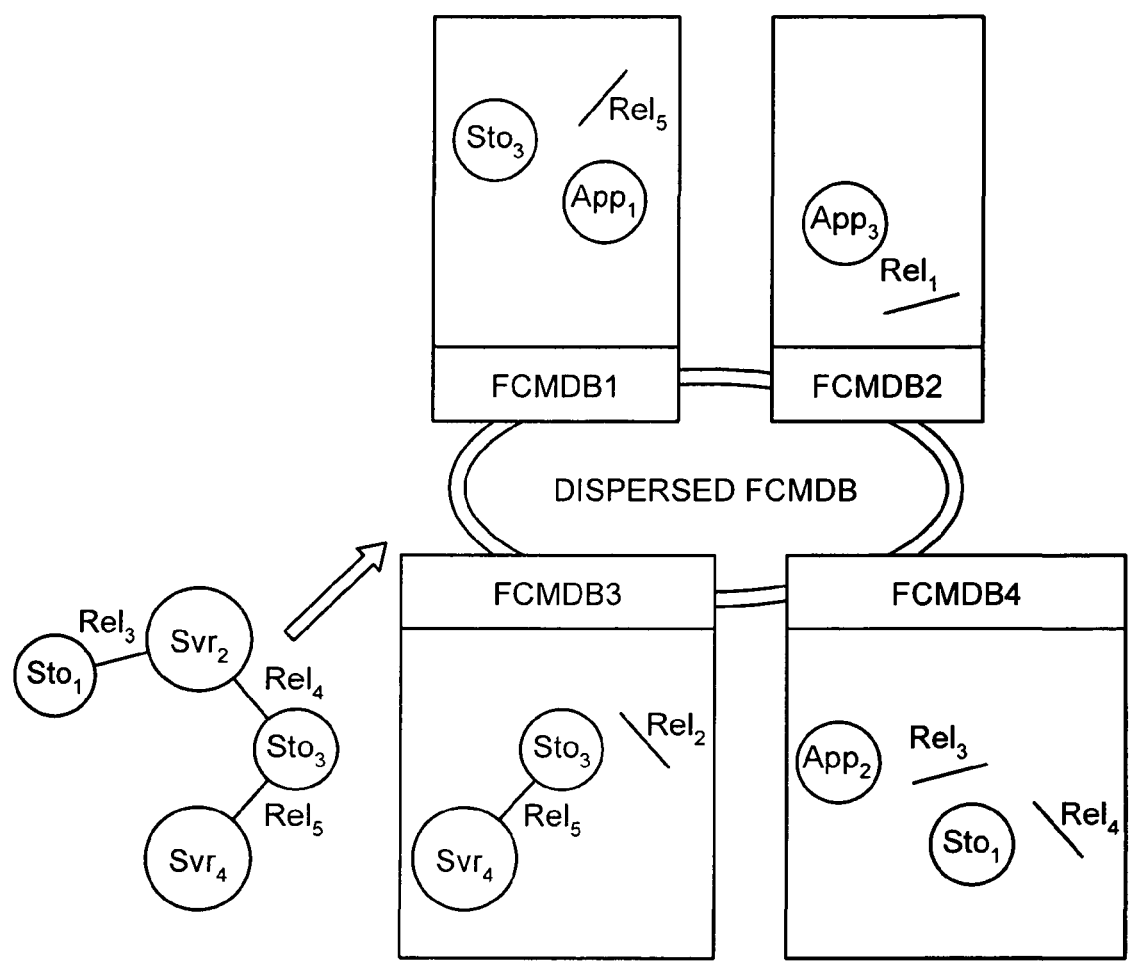
FIG. 7 is a diagram illustrating an example of an operation to create a duplicate of a CI having a feature.
Figure 8:
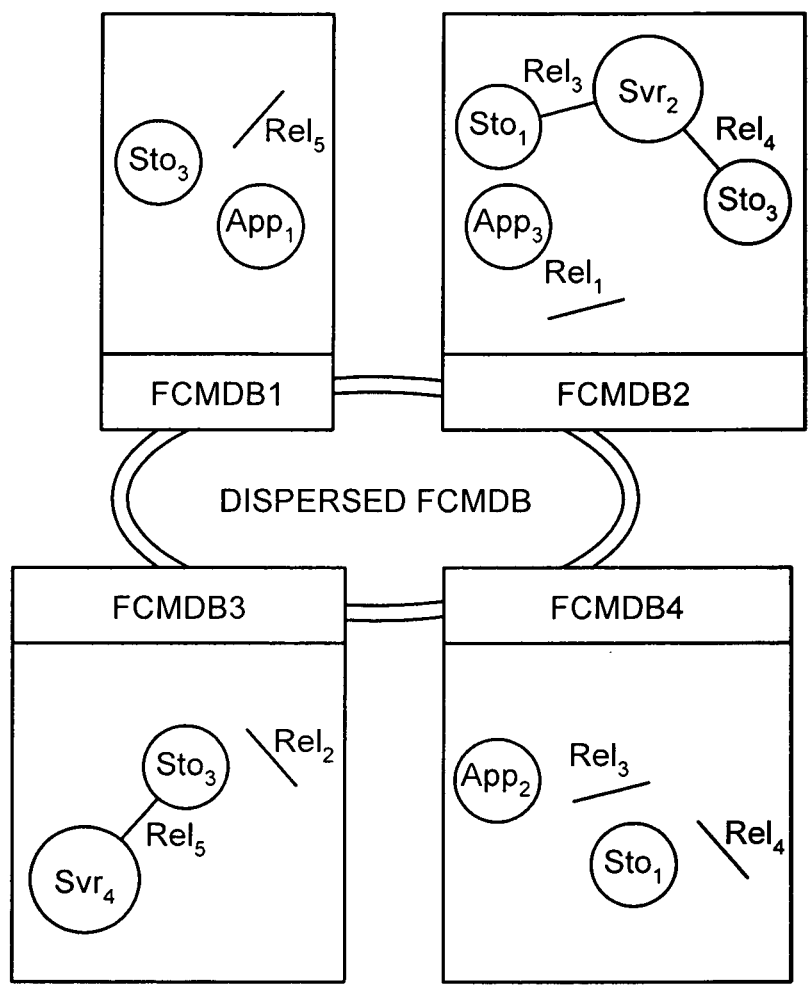
FIG. 8 is a diagram illustrating an example to create a duplicate of a CI having a feature.

Referring now to FIGS. 7 and 8, an example of an operation to create a duplicate of a CI having a CI classification with a feature is described. FIG. 7 illustrates the state of the distributed FCMDB before a CI having a feature is registered. FIG. 8 illustrates the state of the distributed FCMDB after the CI having the feature is registered. It is noted that the configuration information contains the CIs of $Sto_1$, $Svr_2$, $Sto_3$ and $Svr_4$, and $Svr_2$ and $Svr_4$ are CIs having features. Also, $Svr_2$ contained in the configuration information is to be registered last.

As illustrated in FIG. 7, $Svr_2$ is not registered in any FCMDB in the distributed FCMDB. As illustrated in FIG. 8, since $Svr_2$ has a CI classification with a feature, the configuration item duplicate creating unit 24a searches for a CI set that can be reached by tracing Rels from $Svr_2$ among the CIs contained in the configuration information, and have featureless CI classification. As a result, the configuration item duplicate creating unit 24a generates a set having $Sto_1$ and $Sto_3$ as elements. The configuration item duplicate creating unit 24a also creates duplicates of the subject CIs existing on the way to $Sto_1$ and $Sto_3$ contained in the set reached from $Svr_2$, or duplicates of $Sto_1$ and $Sto_3$, as well as duplicates of $Rel_3$ and $Rel_4$. The duplicates are created in the FCMDB2 that manages $Svr_2$.

Referring back to FIG. 3, where the CIs subject to duplicate creating operations include a CI classification having no features, the configuration item duplicate creating unit 24a searches for a set of CIs that can be reached by tracing Rels from a CI subject to a duplicate creating operation among the CIs contained in the configuration information, and have CI classifications with features. The configuration item duplicate creating unit 24a also requests the inter-FCMDB data transmitting/receiving unit 40 to create duplicates of the subject CI and the subject Rel existing on the way to set CIs contained in the set reached from a CI subject to a duplicate creating operation. The duplicates are created in the FCMDB that manages the CI having a CI classification with a feature.

The item relationship duplicate creating unit 24b sequentially performs a duplicate creating operation for each of the Rels contained in the configuration information. Specifically, the item relationship duplicate creating unit 24b selects a Rel that is subject to a duplicate creating operation and associates CIs with each other at both ends of the Rel. One of the CIs is a CI having a CI classification with a feature, and the other CI is a CI having a CI classification without a feature. The item relationship duplicate creating unit 24b also searches for a set of CIs that can be reached by tracing Rels from the CI related to the selected Rel and having a CI classification without a feature, and have featureless CI classifications, among the CIs contained in the configuration information. The item relationship duplicate creating unit 24b also requests the inter-FCMDB data transmitting/receiving unit 40 to create duplicates of the subject CI and the subject Rel existing on the way to CIs contained in the set reached from a CI having a CI classification with a feature. The duplicates are created in the FCMDB that manages the CI having a CI classification with a feature.

Figure 9:
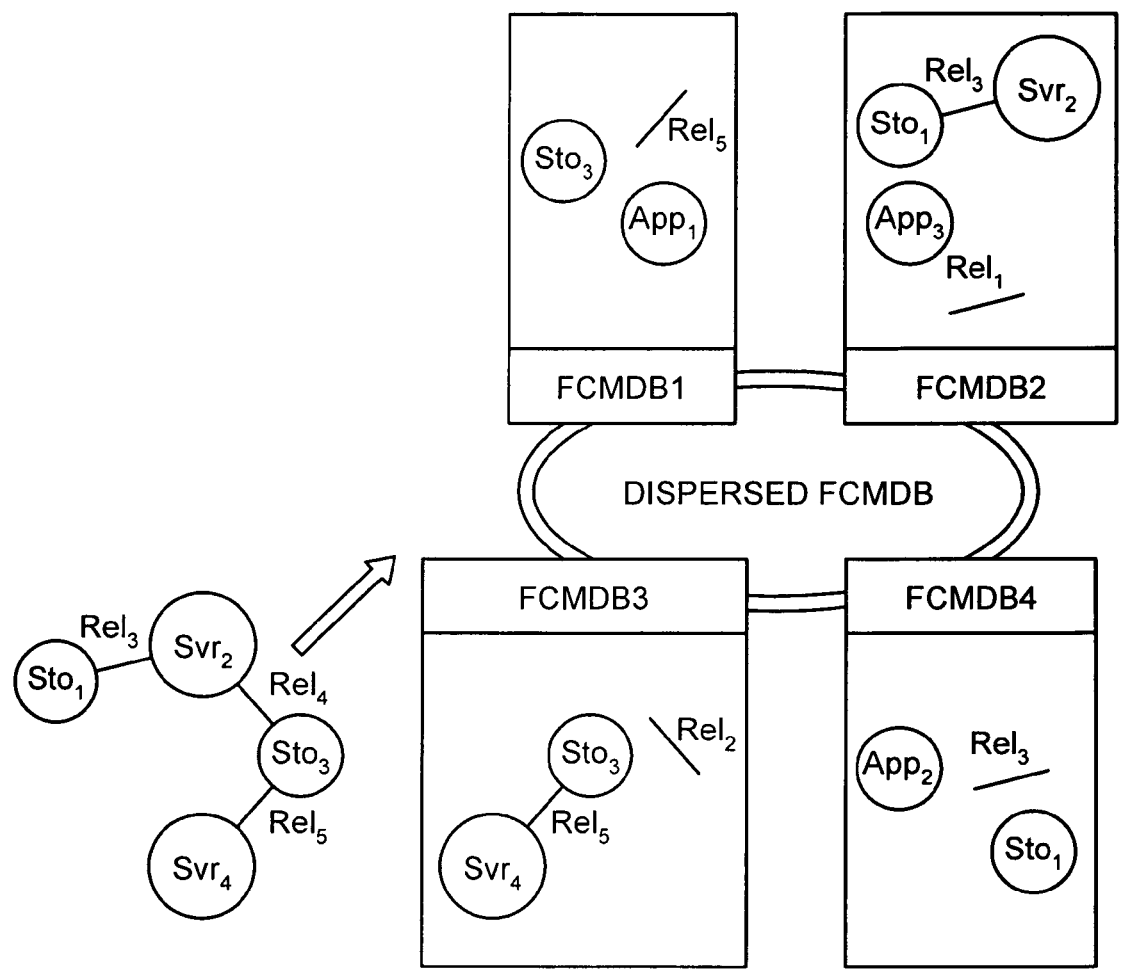
FIG. 9 is a diagram illustrating an example of an operation to create a duplicate of Rel.
Figure 10:
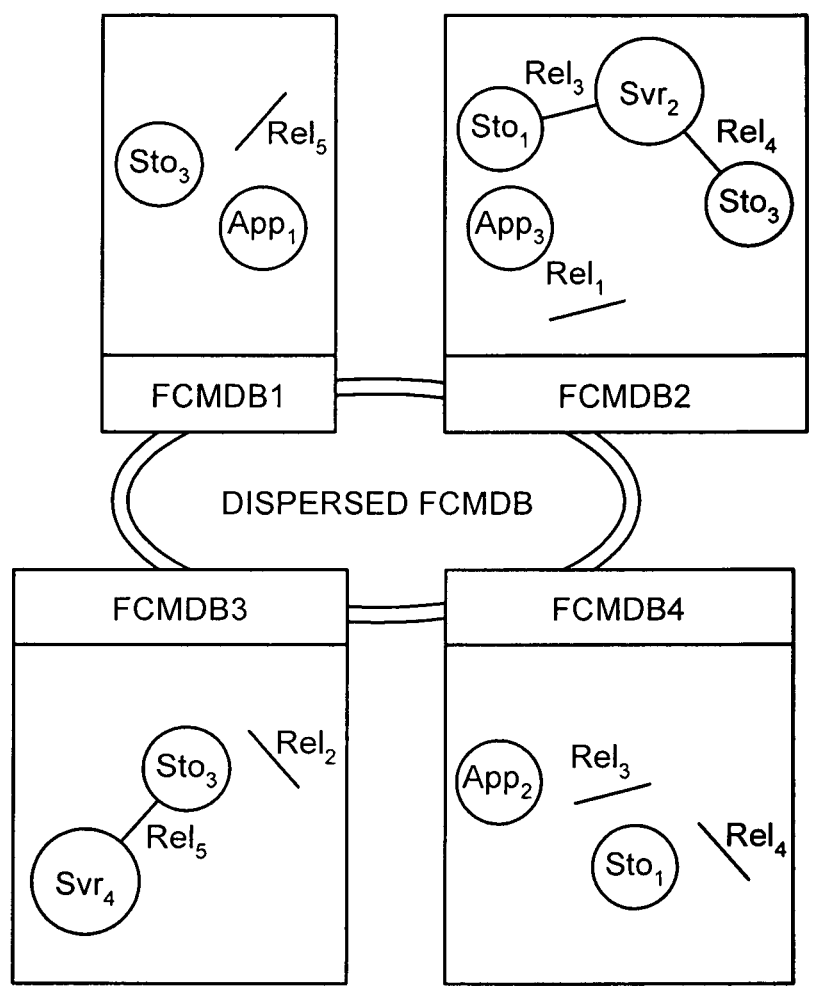
FIG. 10 is a diagram illustrating an example of a duplicate of Rel.

Referring now to FIGS. 9 and 10, an example of an operation to create a duplicate of a Rel is described. FIG. 9 illustrates the state of the distributed FCMDB before a Rel is registered. FIG. 10 illustrates the state of the distributed FCMDB after the Rel is registered. It is noted that the configuration information contains the CIs of $Sto_1$, $Svr_2$, $Sto_3$ and $Svr_4$, and Rels of $Rel_3$, $Rel_4$, and $Rel_5$. In this configuration information, $Svr_2$ and $Svr_4$ are CIs having features. Also, $Rel_4$ contained in the configuration information is to be registered last.

As illustrated in FIG. 9, $Rel_4$ is not registered in any FCMDB in the distributed FCMDB. As illustrated in FIG. 10, the item relationship duplicate creating unit 24b selects $Rel_4$, which associates the CIs of $Svr_2$ and $Sto_3$ with each other at both ends of $Rel_4$. One of the CI is $Svr_2$ having a CI classification with a feature, and the other one is $Sto_3$ having a CI classification without a feature. The item relationship duplicate creating unit 24b also searches for a set of CIs that can be reached by tracing Rels from $Sto_3$ related to the selected $Rel_4$ having a CI classification without a feature, and have featureless CI classification, among the CIs contained in the configuration information. As a result, the item relationship duplicate creating unit 24b generates a set having $Sto_3$ as an element. The item relationship duplicate creating unit 24b also creates duplicates of the subject CIs existing on the way to $Sto_3$ contained in the set reached from $Svr_2$ having a CI classification with a feature, or a duplicate of $Sto_3$ and a duplicate of the subject $Rel_4$. The duplicates are created in FCMDB2, which manages $Svr_2$.

Referring back to FIG. 3, when the feature existence change determining unit 22c determines that there has been a change in the feature existence column of the CI classifications of CIs, the duplicate updating unit 24c updates the duplicates of a CI that is already registered in the entity information storage unit 11 and has the CI classification having the change in the feature existence column, based on the change result. Specifically, when the feature existence column of the CI classification of a CI changes from "NONE" to "FEATURE EXISTS", the duplicate updating unit 24c selects all the CIs having the same CI classification as the subject CI classification from the CIs already stored in the entity information storage unit 11. The duplicate updating unit 24c also searches for a set of CIs that can be reached from the selected CI by tracing Rels, and have featureless CI classification. For example, to search for the CIs associated with the selected CI, the duplicate updating unit 24c makes inquiries to all the FCMDBs by broadcast via the inter-FCMDB data transmitting/receiving unit 40. The duplicate updating unit 24c then requests the inter-FCMDB data transmitting/receiving unit 40 to create a duplicate of the subject CI and a duplicate of the subject Rel existing on the way to CIs contained in the set reached from the selected CI. The duplicates are created in the FCMDB that manages the selected CI or a CI having a CI classification with a feature.

When the feature existence column of the CI classification of a CI changes from "FEATURE EXISTS" to "NONE", the duplicate updating unit 24c selects all the CIs having the same CI classification as the subject CI classification from the CIs already stored in the entity information storage unit 11. The duplicate updating unit 24c also searches for a set of CIs that can be reached from the selected CI by tracing Rels, and have CI classifications with features. For example, to search for the CIs associated with the selected CI, the duplicate updating unit 24c makes inquiries to all the FCMDBs by broadcast via the inter-FCMDB data transmitting/receiving unit 40. The duplicate updating unit 24c then requests the inter-FCMDB data transmitting/receiving unit 40 to create a duplicate of the subject CI and a duplicate of the subject Rel existing on the way to CIs contained in the set reached from the selected CI. The duplicates are created in the FCMDB that manages a CI having a CI classification with a feature.

Figure 11:
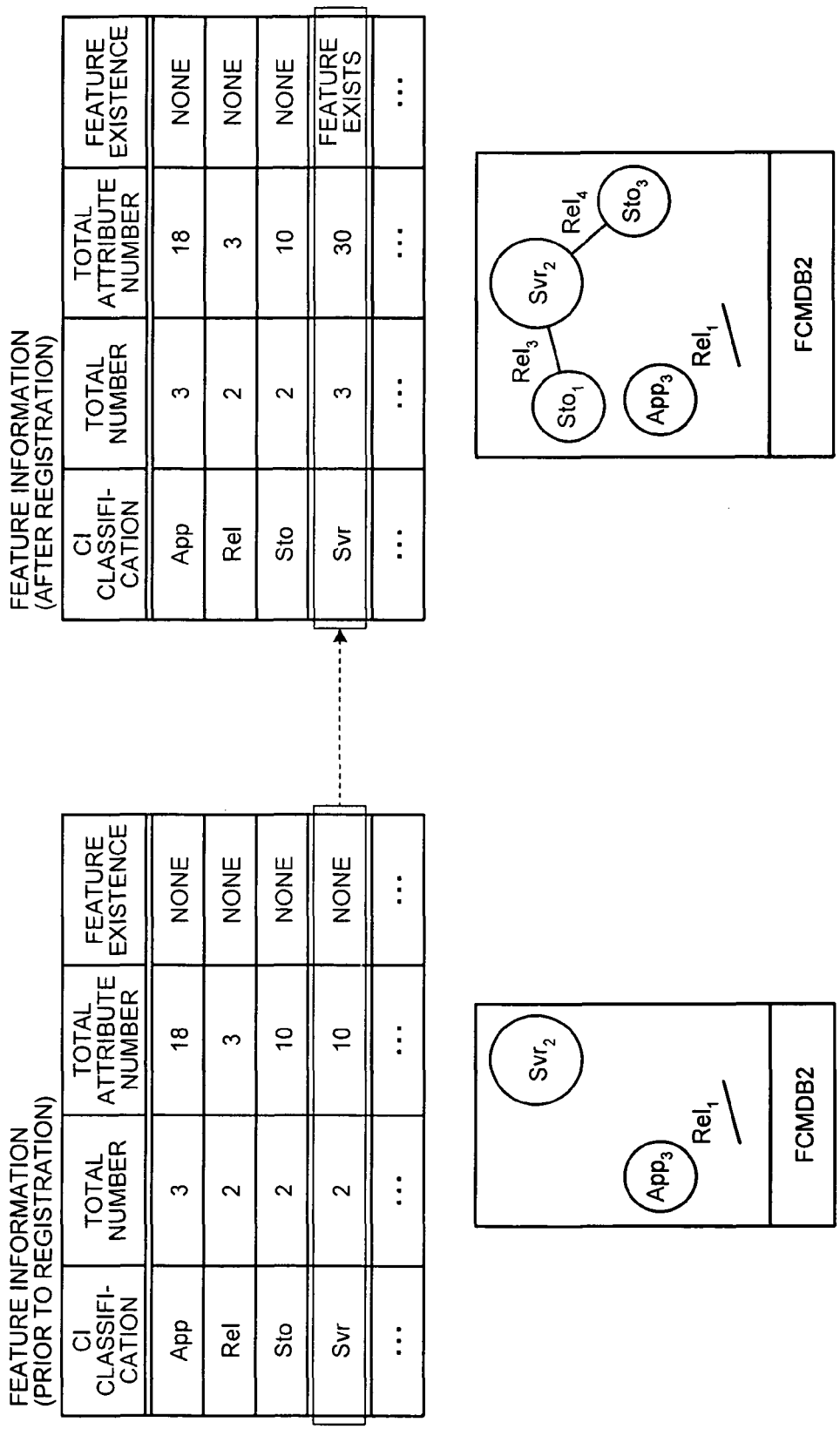
FIG. 11 is a diagram illustrating an example of an operation to create duplicates of CIs when a CI is changed to a CI having a feature.
Figure 12:
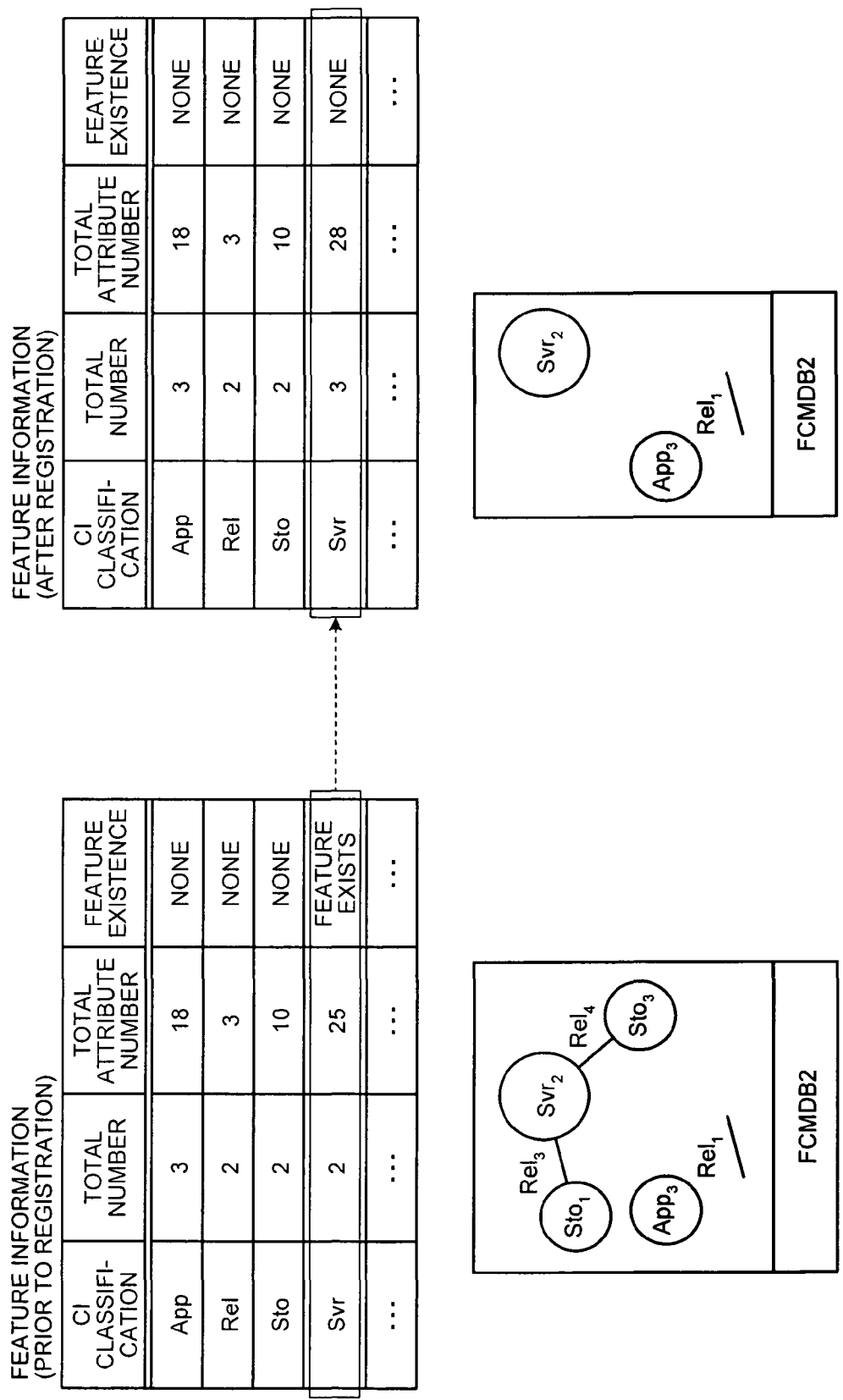
FIG. 12 is a diagram illustrating an example of an operation to delete duplicates of CIs when a CI is changed to a featureless CI.

Referring now to FIGS. 11 and 12, examples of operations to create duplicates of CIs in a case where the feature existence column of the CI classification of a CI is changed are described. FIG. 11 illustrates a case where a CI is changed to a CI having a feature. FIG. 12 illustrates a case where a CI is changed to a featureless CI.

FIG. 11 is a diagram illustrating an example of an operation to create duplicates of CIs in a case where a CI is changed to a CI having a feature. As illustrated in FIG. 11, before a CI having a CI classification Svr is registered, the feature existence column of Svr indicates "NONE", and $Svr_2$ and $App_3$ are registered in the FCMDB2. In the feature information storage unit 12, the feature existence column of the CI classification Svr indicates "NONE". When the feature existence column of Svr is changed from "NONE" to "FEATURE EXISTS" after the CI having the CI classification Svr is registered, the duplicate updating unit 24c selects $Svr_2$ having the same CI classification as the CI classification Svr from the CIs already stored in the entity information storage unit 11. The duplicate updating unit 24c also searches for a set of CIs that can be reached from the selected $Svr_2$ by tracing Rels, and have featureless CI classifications. As a result, the duplicate updating unit 24c generates a set having $Sto_1$ and $Sto_3$ as elements. The duplicate updating unit 24c then creates duplicates of the subject CIs existing on the way to $Sto_1$ and $Sto_3$ contained in the set reached from the selected $Svr_2$, or duplicates of $Sto_1$ and $Sto_3$. The duplicates are created in the FCMDB2, which manages $Svr_2$. The duplicate updating unit 24c also creates duplicates of the subject Rels existing on the way to $Sto_1$ and $Sto_3$ contained in the set reached from the selected $Svr_2$, or duplicates of $Rel_3$ and $Rel_4$. The duplicates are created in the FCMDB2, which manages $Svr_2$.

FIG. 12 is a diagram illustrating an example of an operation to create duplicates of CIs in a case where a CI is changed to a featureless CI. As illustrated in FIG. 12, before a CI having a CI classification Svr is registered, the feature existence column of Svr indicates "FEATURE EXISTS", and $Sto_1$ and $Sto_3$ having no features are associated with $Svr_2$ having a feature by $Rel_3$ and $Rel_4$, respectively, in the FCMDB2. In the feature information storage unit 12, the feature existence column of the CI classification Svr indicates "FEATURE EXISTS". When the feature existence change determining unit 22c determines that the feature existence column of the CI classification Svr has changed from "FEATURE EXISTS" to "NONE" after the registration of a CI having the CI classification Svr, $Sto_1$ and $Sto_3$ associated with $Svr_2$ belonging to the same CI classification as the CI classification Svr, and $Rel_3$ and $Rel_4$ are deleted from the entity information storage unit 11. Although not illustrated in the drawing, the duplicate updating unit 24c creates duplicates of the subject CI and the subject Rel on the way to a CI having a feature from $Svr_2$. The duplicates are created in the FCMDB managing the CI whose classification has a feature.

Referring back to FIG. 3, upon receipt of a search request for a search formula that associates CIs with one another by Rels from a client or a MDR, the search request receiving unit 31 outputs the search formula requested for registration to the divisional-search-formula dividing unit 32a. It is noted that a search formula is a formula that associates CIs with one another by Rels.

In a case where a CI having a CI classification with a feature exists in a search formula, the divisional-search-formula dividing unit 32a divides the search formula into divisional search formulas by tracing Rels backward from the top CI of the search formula, so that each CI having a CI classification with a feature becomes a starting point. The divisional-search-formula dividing unit 32a determines whether a CI having a CI classification with a feature exists among the CIs in a search formula, referring to the feature information storage unit 12.

The divisional-search-formula search unit 32b sequentially performs search operations on the divisional search formulas divided by the divisional-search-formula dividing unit 32a, starting from the divisional search formula at the top. Specifically, the divisional-search-formula search unit 32b determines the registration destination FCMDB of the top CI in the divisional search formula at the top, in accordance with the value calculated by the registration destination FCMDB calculating unit 23. The divisional-search-formula search unit 32b also issues a search operation request for a divisional search formula to the determined registration destination FCMDB via the inter-FCMDB data transmitting/receiving unit 40. Based on the search result in the divisional search formula, the divisional-search-formula search unit 32b also creates the next divisional search formula, and determines the registration destination FCMDB of the top CI in this divisional search formula, in accordance with the value calculated by the registration destination FCMDB calculating unit 23. The divisional-search-formula search unit 32b again issues a search operation request for a divisional search formula to the determined registration destination FCMDB via the inter-FCMDB data transmitting/receiving unit 40. The divisional-search-formula search unit 32b performs the search operations for the divided divisional search formulas in this manner, and acquires an ultimate search result.

Figure 13:
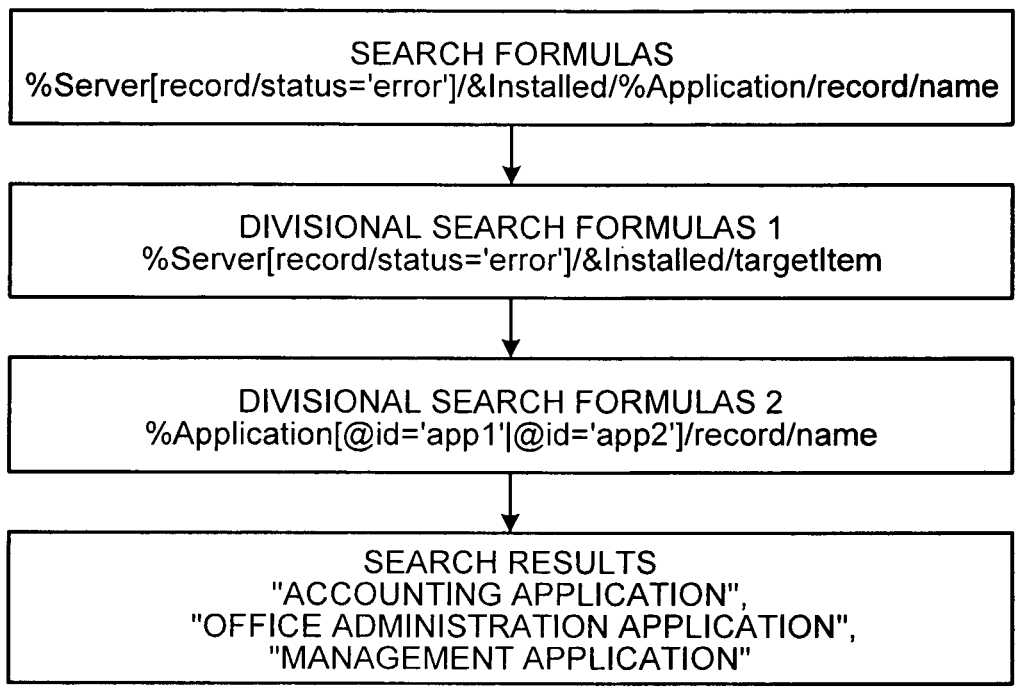
FIG. 13 is a diagram illustrating an example of a search operation.
Figure 14:
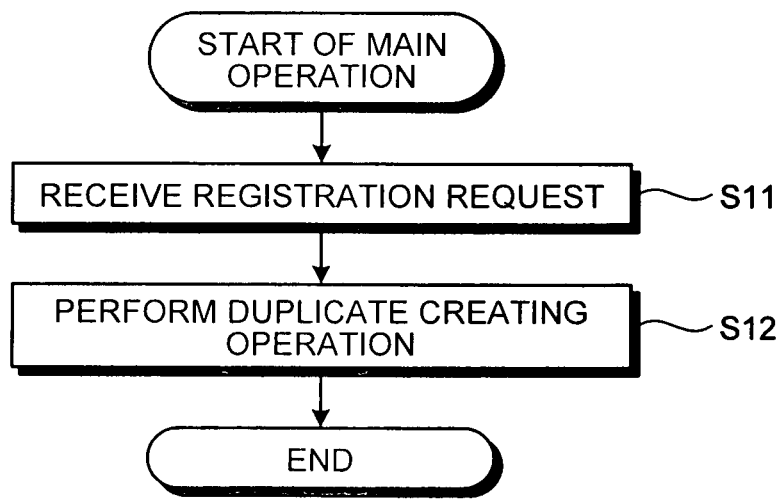
FIG. 14 is a flowchart illustrating a processing operation of the management unit.

Referring now to FIG. 13, an example of an operation to be performed by the search processing unit 32 to search the information about the configuration information is described. FIG. 13 is a diagram illustrating an example of a search operation to be performed to "acquire the name of an application running in a crashed server". FIG. 13 illustrates a search formula divided into divisional search formula. FIG. 13 illustrates execution of a search operation.

First, in FIG. 13, CIs, "Server" and "Application", are contained in a search formula, and those CIs are associated with each other by Rel, "Installed". It is noted that "Server" and "Application" are CIs having CI classifications with features. The divisional-search-formula dividing unit 32a divides the search formula into divisional search formulas so that each CI having a CI classification with a feature becomes a starting point. In the example illustrated in FIG. 13, the search formula is divided into a divisional search formula 1 having "Server" as the starting point, and a divisional search formula 2 having "Application" as the starting point.

In FIG. 13, the divisional-search-formula search unit 32b issues a request for an operation to search the divisional search formula 1 to the registration destination FCMDB of "Server" representing the top CI of the divisional search formula 1 at the top, and obtains the search results. If the search results are "app1" and "app2", for example, the divisional-search-formula search unit 32b creates the next divisional search formula 2, based on the search results. The divisional-search-formula search unit 32b also issues a request for an operation to search the divisional search formula 2 to the registration destination FCMDB of "Application" representing the top CI of the divisional search formula 2, and obtains the search results. The divisional-search-formula search unit 32b obtains an "accounting application", an "office administration application", and a "management application" as the results of the search of the search formula.

Figure 15:
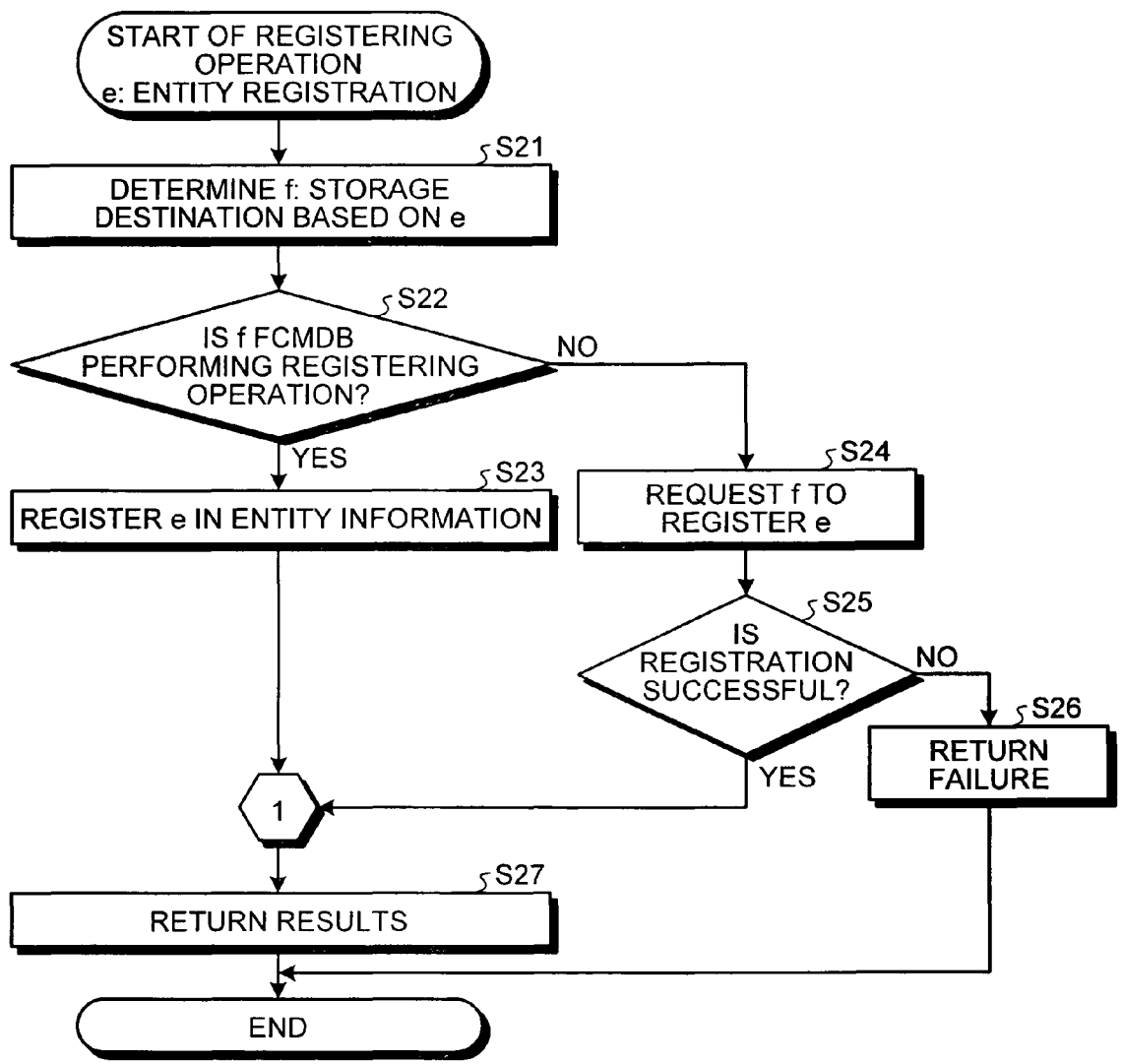
FIG. 15 is a flowchart illustrating the processing operation of the registration processing unit.
Figure 16:
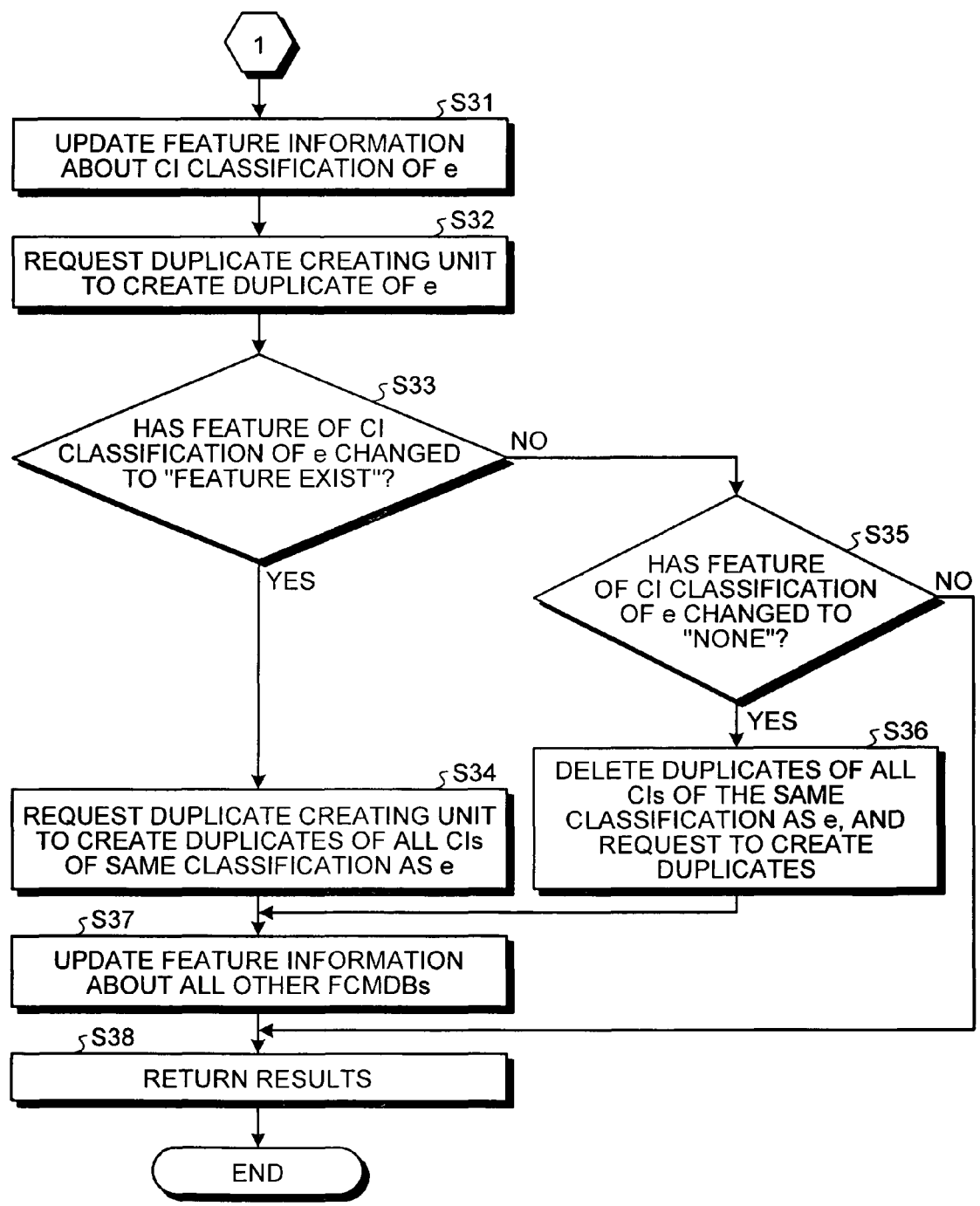
FIG. 16 is a flowchart illustrating the processing operation of the registration processing unit.
Figure 17:
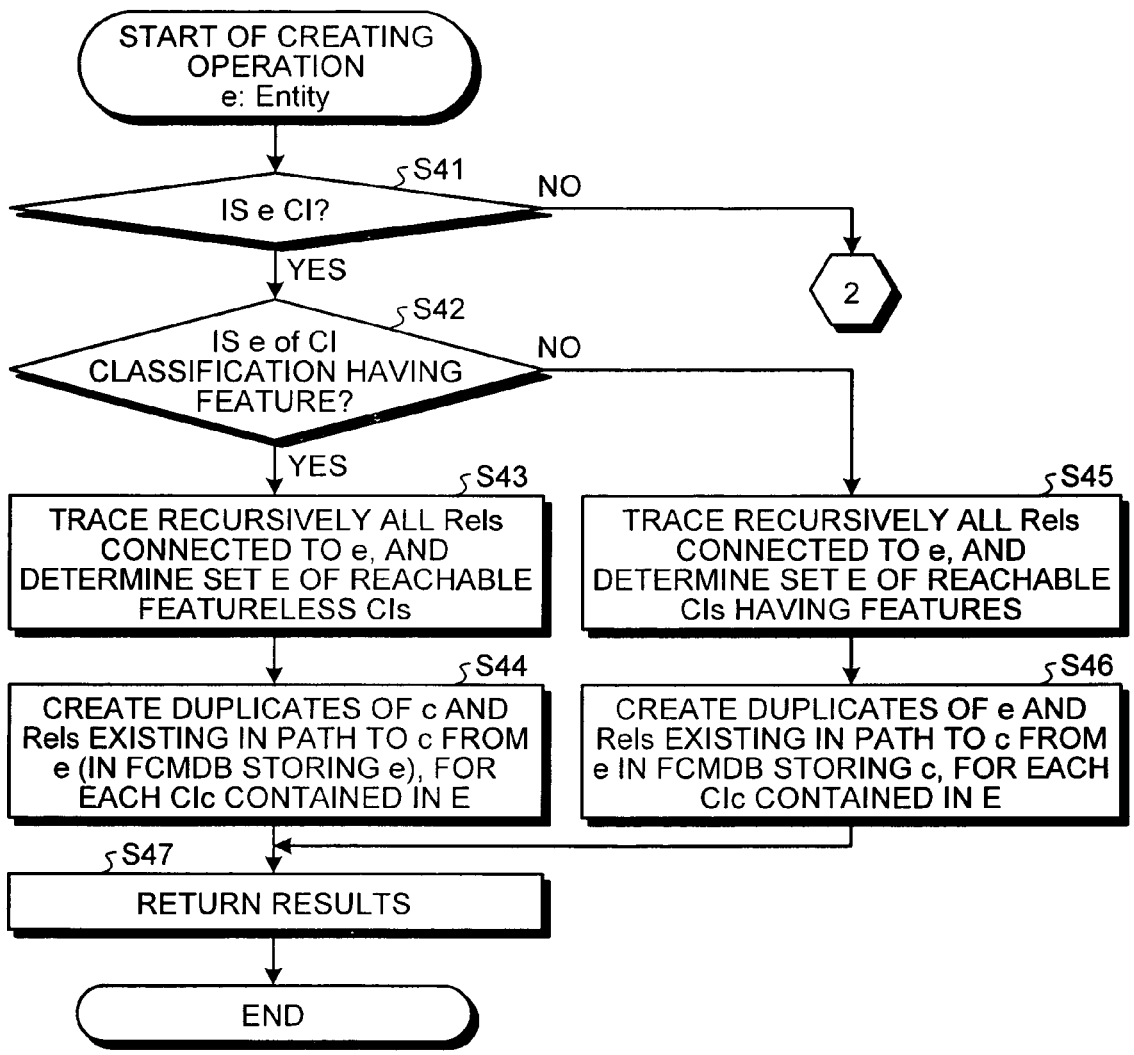
FIG. 17 is a flowchart illustrating the processing operation of the duplicate creating unit.
Figure 18:
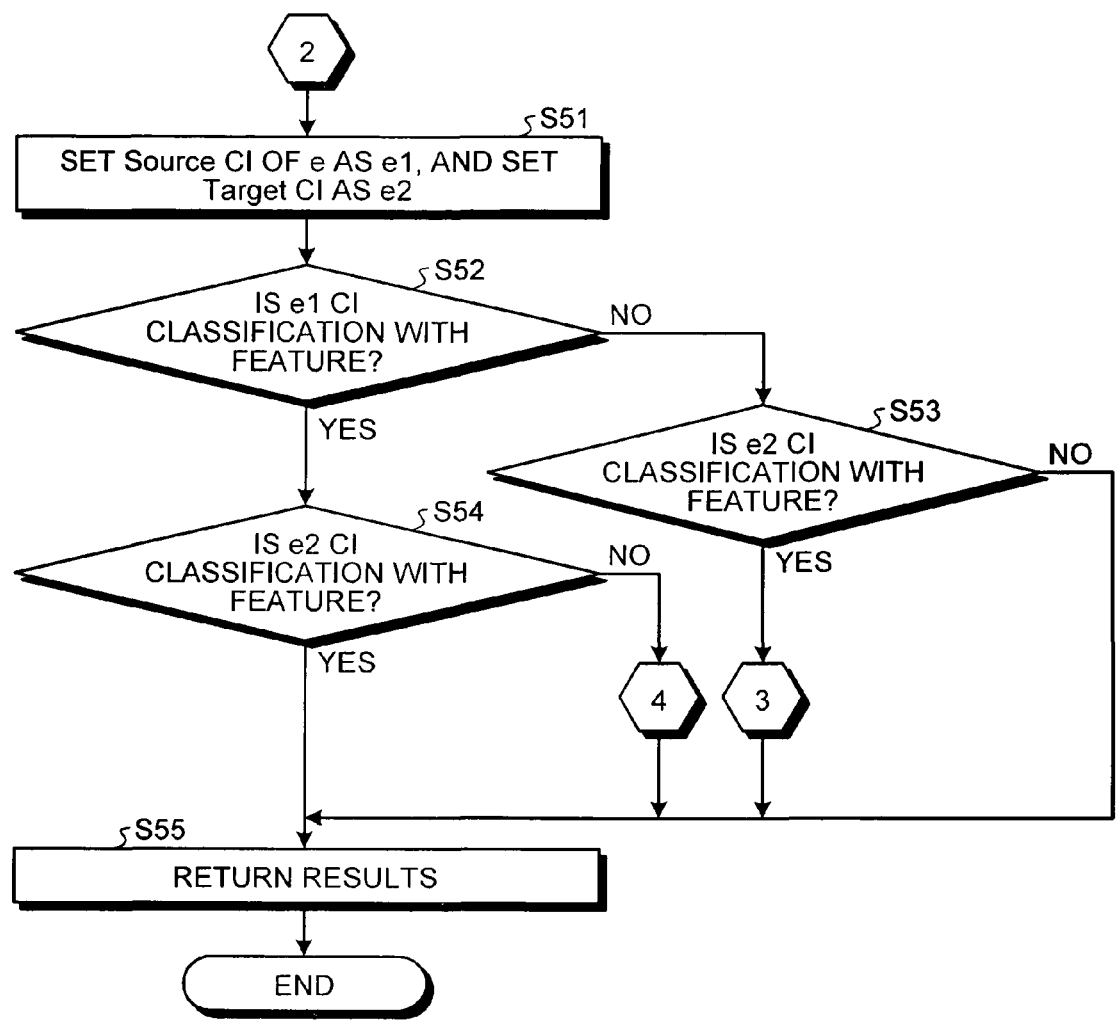
FIG. 18 is a flowchart illustrating the processing operation of the duplicate creating unit.
Figure 19:
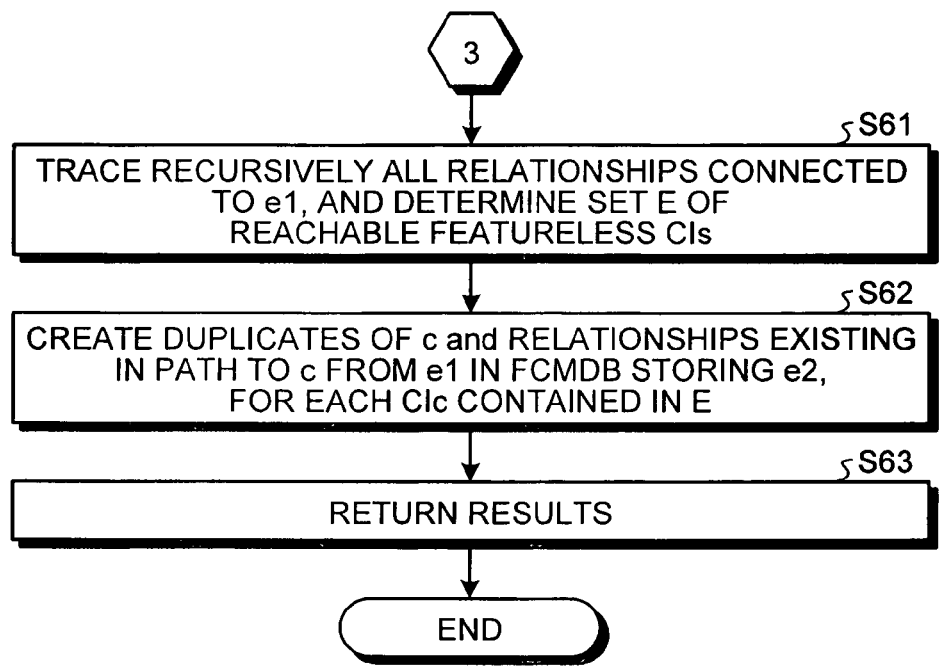
FIG. 19 is a flowchart illustrating the processing operation of the duplicate creating unit.
Figure 20:
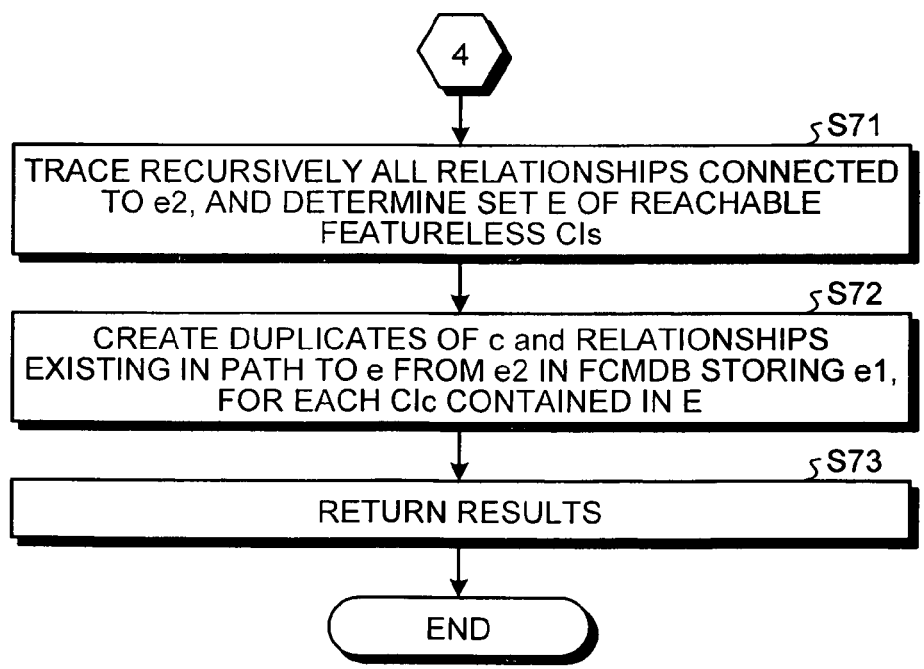
FIG. 20 is a flowchart illustrating the processing operation of the duplicate creating unit.
Figure 21:
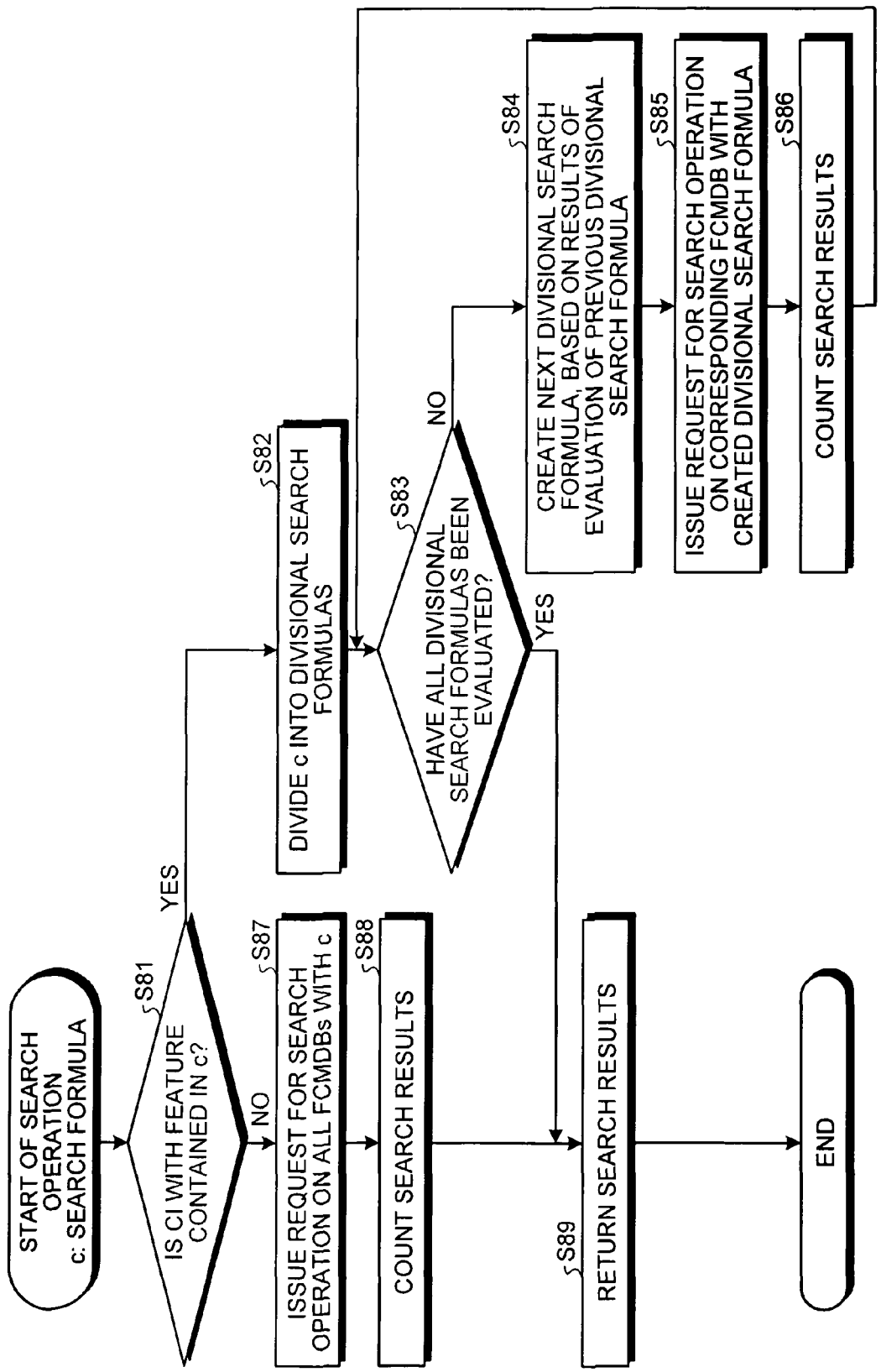
FIG. 21 is a flowchart illustrating the processing operation of the search unit.

Procedures in Configuration Information Management Operation According to Second Embodiment Referring now to FIGS. 14 through 21, the procedures in a configuration information management operation according to the second embodiment are described. FIGS. 15 and 16 are flowcharts illustrating processing operations of the registration processing unit. FIGS. 17 through 20 are flowcharts illustrating processing operations of the duplicate creating unit. FIG. 21 is a flowchart illustrating a processing operation of the search processing unit.

Procedures in Main Operation

First, upon receipt of a configuration information registration request from a MDR (step S11), the registration request receiving unit 21 outputs the configuration information requested for registration to the registration processing unit 22 to perform a duplicate creating operation (step S12).

Procedures to be Carried Out by Registration Processing Unit

Obtaining the configuration information from the registration request receiving unit 21, the registration processing unit 22 performs the following operation for each of the entities (CIs and Rels) contained in the configuration information. The entity registering unit 22a outputs the identification id 11a of an entity to the registration destination FCMDB calculating unit 23, and determines the registration destination FCMDB in accordance with the value calculated by the registration destination FCMDB calculating unit 23 (step S21).

The entity registering unit 22a determines whether the registration destination FCMDB is its own FCMDB (step S22). If the registration destination FCMDB is its own FCMDB, the entity registering unit 22a registers the entity in the entity information storage unit 11 (step S23), and the operation moves on to the feature existence calculating unit 22b, and the operation results are returned to the main operation (step S27). If the registration destination FCMDB is not its own FCMDB, on the other hand, the entity registering unit 22a requests the registration destination FCMDB to register the entity via the inter-FCMDB data transmitting/receiving unit 40 (step S24), and determines whether the registration has been successful (step S25).

Where the registration of the entity has not been successful ("No" in step S25), the entity registering unit 22a ends the operation of the registration processing unit 22. When the entity registering unit 22a determines that the registration of the entity has been successful ("Yes" in step S25), the operation moves on to the feature existence calculating unit 22b, and the operation results are returned to the main operation (step S27).

The feature existence calculating unit 22b performs the following operation for each of the entities contained in the configuration information. The feature existence calculating unit 22b adds the feature existence column 12d of the CI classification 12a classifying an entity to the feature information storage unit 12, or updates the feature existence column 12d of the CI classification 12a classifying the entity in the feature information storage unit 12 (step S31). Specifically, the feature existence calculating unit 22b adds up the attribute numbers of all the entities of the same CI classification 12a as the CI classification 12a classifying an entity, and performs this operation for each of the entities contained in the configuration information. The feature existence calculating unit 22b also calculates the average attribute number of the entities belonging to the subject CI classification 12a, from the total attribute number obtained through the addition. The feature existence calculating unit 22b stores the feature existence column 12d corresponding to the calculated average attribute number into the feature information storage unit 12.

The feature existence calculating unit 22b then requests the duplicate creating unit 24 to perform a duplicate creating operation on the entities (CIs or Rels) contained in the configuration information (step S32).

After that, the feature existence change determining unit 22c determines whether the feature existence column of the CI classification 12a of an entity contained in the configuration information has changed from "NONE" to "FEATURE EXISTS" (step S33). Where the feature existence column of the CI classification 12a of an entity has changed from "NONE" to "FEATURE EXISTS" ("Yes" in step S33), the feature existence change determining unit 22c requests the duplicate creating unit 24 to perform a duplicate creating operation on all the CIs having the same CI classification 12a as the subject entity (step S34).

Where the feature existence column of the CI classification 12a of the entity has not changed from "NONE" to "FEATURE EXISTS" ("No" in step S33), the feature existence change determining unit 22c determines whether the feature existence column of the CI classification 12a of the entity has changed from "FEATURE EXISTS" to "NONE" (step S35). Where the feature existence column of the CI classification 12a of the entity has changed from "FEATURE EXISTS" to "NONE" ("Yes" in step S35), the feature existence change determining unit 22c deletes the duplicates of the CIs associated with each of all the CIs belonging to the same CI classification as the CI classification 12a of the subject entity. The feature existence change determining unit 22c then requests the duplicate creating unit 24 to perform a duplicate creating operation (step S36). Where the feature existence column of the CI classification 12a of the entity has not changed ("No" in step S35), returns the operation results to the entity registering unit 22a (step S38).

When the duplicate creating operation performed by the duplicate creating unit 24 is finished, the feature information updating unit 22d updates the feature information storage units 12 of all the FCMDBs other than its own FCMDB (step S37), and returns the operation results to the entity registering unit 22a (step S38).

Procedures to be Carried Out by Duplicate Creating Unit

Next, the duplicate creating unit 24 determines whether a subject entity is a CI (step S41). If the subject entity is a CI ("Yes" in step S41), the operation moves on to the configuration item duplicate creating unit 24a, as long as the feature existence column of the CI has not changed. Where the feature existence column of the CI has changed, the operation moves on to the duplicate updating unit 24c.

The configuration item duplicate creating unit 24a (the duplicate updating unit 24c) determines whether the CI is of a CI classification having a feature (step S42). If the CI is of a CI classification having a feature ("Yes" in step S42), the configuration item duplicate creating unit 24a (the duplicate updating unit 24c) searches for a set e of CIs that can be reached by tracing Rels from a CI subject to the duplicate creating operation among the CIs contained in the configuration information (or already stored in the entity information storage unit 11), and have featureless CI classifications (step S43). In the case of the duplicate updating unit 24c, to search for CIs associated with the CI subject to the duplicate creating operation, the duplicate updating unit 24c makes inquiries to all the FCMDBs by broadcast via the inter-FCMDB data transmitting/receiving unit 40, for example.

The configuration item duplicate creating unit 24a (the duplicate updating unit 24c) then creates duplicates of the subject CIs and duplicates of the subject Rels existing on the way from the CI subject to the duplicate creating operation to the CIs contained in the set e. The duplicates are created in the FCMDB that manages the CI subject to the duplicate creating operation or the CI having the CI classification with a feature, via the inter-FCMDB data transmitting/receiving unit 40 (step S44).

If the CI is not of a CI classification having a feature ("No" in step S42), on the other hand, the configuration item duplicate creating unit 24a (the duplicate updating unit 24c)

searches for a set e of CIs that can be reached by tracing Rels from the CI subject to the duplicate creating operation among the CIs contained in the configuration information (or already stored in the entity information storage unit 11), and have CI classifications with features (step S45). In the case of the duplicate updating unit 24c, to search for CIs associated with the CI subject to the duplicate creating operation, the duplicate updating unit 24c makes inquiries to all the FCMDBs by broadcast via the inter-FCMDB data transmitting/receiving unit 40, for example.

The configuration item duplicate creating unit 24a (the duplicate updating unit 24c) then creates duplicates of the subject CIs and duplicates of the subject Rels existing from the CI subject to the duplicate creating operation to the CIs contained in the set e. The duplicates are created in the FCMDB that manages the CI having the CI classification with a feature, via the inter-FCMDB data transmitting/receiving unit 40 (step S46).

If the entity is not a CI ("No" in step S41), the operation of the duplicate creating unit 24 moves on to the item relationship duplicate creating unit 24b to perform a Rel duplicate creating operation. The item relationship duplicate creating unit 24b sets the source id 11f as e1, which is one of the CIs associated with each other by a Rel at the two ends, and sets the target id 11g as e2, which is the other one of the CIs (step S51).

The item relationship duplicate creating unit 24b then determines whether e1 is a CI having a CI classification with a feature (step S52). If e1 is not a CI having a CI classification with a feature ("No" in step S52), the item relationship duplicate creating unit 24b determines whether e2 is a CI having a CI classification with a feature (step S53). If e2 is a CI having a CI classification with a feature ("Yes" in step S53), duplicates of the CIs associated with e2 having a CI classification with a feature are created.

Specifically, the item relationship duplicate creating unit 24b searches for a set e of CIs that can be reached by tracing Rels from e1 having a featureless CI classification, and have featureless CI classifications (step S61). The item relationship duplicate creating unit 24b creates duplicates of the subject CIs and duplicates of the subject Rels existing on the way from e2 having a CI classification with a feature to the CIs contained in the set e. The duplicates are created in the FCMDB that manages e2 having the CI classification with a feature, via the inter-FCMDB data transmitting/receiving unit 40 (step S62).

If e1 is a CI having a CI classification with a feature ("Yes" in step S52), on the other hand, the item relationship duplicate creating unit 24b determines whether e2 is a CI having a CI classification with a feature (step S54). If e2 is not a CI having a CI classification with a feature ("No" in step S54), duplicates of the CIs associated with e1 having a CI classification with a feature are created. The specific procedures to be carried out here are illustrated in a flowchart of FIG. 20, and the same as those in the case where duplicates of the CIs associated with e2 having a CI classification with a feature are created, and therefore, explanation of them is omitted herein.

If e1 is not a CI having a CI classification with a feature ("No" in step S52) and e2 is not a CI having a CI classification with a feature ("No" in step S53), the item relationship duplicate creating unit 24b moves on to step S55. Further, if e1 is a CI having a CI classification with a feature ("Yes" in step S52) and e2 is a CI having a CI classification with a feature ("Yes" in step S54), the item relationship duplicate creating unit 24b moves on to step S55.

The item relationship duplicate creating unit 24b then returns the operation results to the registration processing unit 22 (step S55). Ending the entity duplicate creating operation, the duplicate creating unit 24 also returns the operation results to the registration processing unit 22 (step S47).

Procedures to be Carried out by Search Processing Unit

First, when the search request receiving unit 31 receives a search request for a search formula c from a client or a MDR, the divisional-search-formula dividing unit 32a determines whether the search formula c contains a CI having a CI classification with a feature (step S81).

If the search formula c contains a CI having a CI classification with a feature ("Yes" in step S81), the divisional-search-formula dividing unit 32a divides the search formula c into divisional search formulas (step S82). Specifically, the search formula is divided into divisional search formulas by tracing Rels backward from the top CI of the search formula, so that each CI having a CI classification with a feature becomes a starting point.

The divisional-search-formula search unit 32b then determines whether all the divisional search formulas have been evaluated (step S83). Where all the divisional search formulas have been evaluated ("Yes" in step S83), the operation moves on to step S89. Where not all the divisional search formulas have been evaluated ("No" in step S83), on the other hand, the divisional-search-formula search unit 32b creates the next divisional search formula, based on the search result of the previous divisional search formula (step S84).

The divisional-search-formula search unit 32b then issues a search operation request for a divisional search formula to the registration destination FCMDB of the top CI in the divisional search formula, via the inter-FCMDB data transmitting/receiving unit 40 (step S85). The divisional-search-formula search unit 32b obtains and counts the search results (step S86). After that, the operation moves on to step S83.

If the search formula c does not contain a CI having a CI classification with a feature ("No" in step S81), the divisional-search-formula search unit 32b issues a search operation request for a search formula to all the FCMDBs (step S87). The divisional-search-formula search unit 32b obtains and counts the search results (step S88). The divisional-search-formula search unit 32b then returns the search results to a requester that has issued the search request (step S89).

Advantages of Second Embodiment

According to the above described second embodiment, in the configuration information management device 2, the CIs and Rels managed by its own device are stored in the entity information storage unit 11 with respect to the CIs and the Rels associating the CIs with one another in a system that is managed by FCMDBs in a distributed manner. Also, in the configuration information management device 2, if a CI stored in the entity information storage unit 11 has a feature, duplicates of the CIs that are associated with the subject CI, managed by other FCMDBs, and do not have features, as well as duplicates of Rels, are created and managed in the entity information storage unit 11. In the configuration information management device 2, when a search request for a search formula that associates CIs with one another by Rels is received, the information about the search formula is searched for with the use of the duplicates created in the entity information storage unit 11. In the configuration information management device 2 having this structure, duplicates of the featureless CIs that are associated with a CI having a feature and managed by other FCMDBs are created and managed in the entity information storage unit 11, together with the CI having a feature. Accordingly, when the configuration information management device 2 searches for information about the search formula by tracing CIs, the amount of search operation across devices can be reduced, compared with the amount of search operation in a case where configuration items are stored in the respective FCMDBs independently of one another, and the search operation can be performed at higher speeds. Moreover, a CI having a feature exists at the starting point of configuration items to be duplicated. Accordingly, there is a higher probability that the starting point of the configuration items to be duplicated matches the starting point of objects to be traced for each search, and the search efficiency can be made even higher.

Also, according to the second embodiment, the management unit 20 includes the entity registering unit 22a that registers the CIs and Rels contained in the configuration information in the entity information storage units 11 of the respective FCMDBs managing the respective CIs and the respective Rels, upon receipt of a configuration information registration request. Also, the management unit 20 includes the duplicate creating unit 24 that, when the first CI contained in the configuration information has a feature, creates duplicates of featureless second CIs associated with the first CI in the configuration information, and duplicates of the Rels between those CIs. Those duplicates are created in the entity information storage unit 11 of the FCMDB that manages the first CI. With this structure, if a CI that is contained in the configuration information and is requested for registration has a feature, the configuration information management device 2 creates duplicates of featureless CIs associated with the subject CI and duplicates of the Rels between those CIs in the same entity information storage unit 11. As a result, even a CI newly registered in the entity information storage unit 11 can be reached through a higher-speed search operation.

Also, according to the second embodiment, the management unit 20 includes the feature existence change determining unit 22c that determines whether the feature existence column of the first CI contained in the configuration information has changed. Also, the duplicate creating unit 24 includes the duplicate updating unit 24c that, when the feature existence change determining unit 22c determines that the feature existence column of the first CI has changed, updates the duplicates of the CIs that are already stored in the entity information storage unit 11 and have the same CI classification as the first CI, based on the change result. With this structure, when the feature existence column of a CI is changed, the duplicate updating unit 24c can create a state corresponding to the changed feature existence column in real time by updating the duplicates of the CIs that are already stored in the entity information storage unit 11 and are of the same kind as the subject CI.

Also, according to the second embodiment, the management unit 20 includes the feature existence calculating unit 22b that calculates the average attribute number of the CIs belonging to the CI classification of the first CI contained in the configuration information, from the total attribute number obtained by adding up the attribute numbers of all the CIs having the same CI classification as the first CI. The feature existence calculating unit 22b determines whether a feature exists, based on the calculated average attribute number. With this structure, when the average attribute number of the CIs belonging to the same CI classification is equal to or higher than a threshold value, the feature existence calculating unit 22b determines that there is a feature. When the average attribute number is lower than the threshold value, the feature existence calculating unit 22b determines that there are no features. Accordingly, a check can be readily made to determine whether a CI has a feature.

Also, according to the second embodiment, the duplicate creating unit 24 creates duplicates of the CIs associated with a CI having a feature and duplicates of the Rels between those CIs. Those duplicates are created in the FCMDB corresponding to a hash value calculated from a character that identifies the CI having a feature. With this structure, the duplicate creating unit 24 can assign the duplicates of the CIs associated with a CI having a feature and the duplicates of the Rels between those CIs to the FCMDB corresponding to the CI having a feature.

Accordingly, higher scalability can be achieved.

SPECIFIC EXAMPLES

Referring now to FIG. 22A, example cases where search formulas are divided into divisional search formulas with the use of the configuration information management device 2 are described. It is noted that, among the CIs contained in the search formulas, "Server" and "Application" are CIs having features, and the other CIs are featureless CIs.

First, in the case of a search formula 1, the divisional-search-formula dividing unit 32a divides the search formula into divisional search formulas so that CIs having features in the search formula 1 become starting points. Since all the CIs other than "Server" have no features, the search formula 1 becomes a divisional search formula. In the case of a search formula 2, the divisional-search-formula dividing unit 32a divides the search formula 2 into a divisional search formula having "Server" at the top, and a divisional search formula having "Application" at the top, since "Application" as well as "Server" has a feature.

Accordingly, in the configuration information management device 2 of this embodiment, only one FCMDB may search for the information about the search formula 1. By a conventional technique illustrated in FIG. 22B by which entities (CIs and Rels) are stored in respective FCMDBs, and a search operation is performed for each entity, search operations are performed across the FCMDBs storing the entities. Therefore, three FCMDBs at a maximum are preferable to perform search operations. Likewise, in the configuration information management device 2, two FCMDBs at a maximum are preferable to search for the information about the search formula 2. By the conventional technique, on the other hand, three FCMDBs at a maximum are preferable to perform search operations. Accordingly, the configuration information management device 2 of this embodiment can reduce the number of search operations across FCMDBs to $\frac{1}{3}$ of the number of search operations performed by the conventional technique in the case of the search formula 1, and $\frac{2}{3}$ of the number of search operations performed by the conventional technique in the case of the search formula 2.

Others

Also, the configuration information management device 1 or 2 can be realized by mounting the respective functions such as the management unit 20, the search unit 30, and the storage unit 10 on a known information processing apparatus such as a personal computer or a workstation.

Also, each of the components of each of the devices illustrated in the drawings may not be formed physically as illustrated in the drawings. That is, the specific forms of separation and integration of the respective devices are not limited to those illustrated in the drawings, and all of or part of them may be functionally or physically separated or integrated as needed, in accordance with various loads and usage. For example, the registration processing unit 22 and the duplicate creating unit 24 may be integrated as one unit. The duplicate creating unit 24 may be divided into a detection unit that searches for configuration information including CIs with features and featureless CIs, and a duplicating unit that duplicates the searched configuration information in the FCMDB managing a CI having a feature. Also, the storage unit 10 may be connected as an external device to the configuration information management device 2 via a network. Also, the management unit 20 and the search unit 30 may be included in separate devices from each other, and be connected via a network to operate in cooperation with each other. The above described functions of the configuration information management device 2 may also be realized in this manner.

Figure 23:
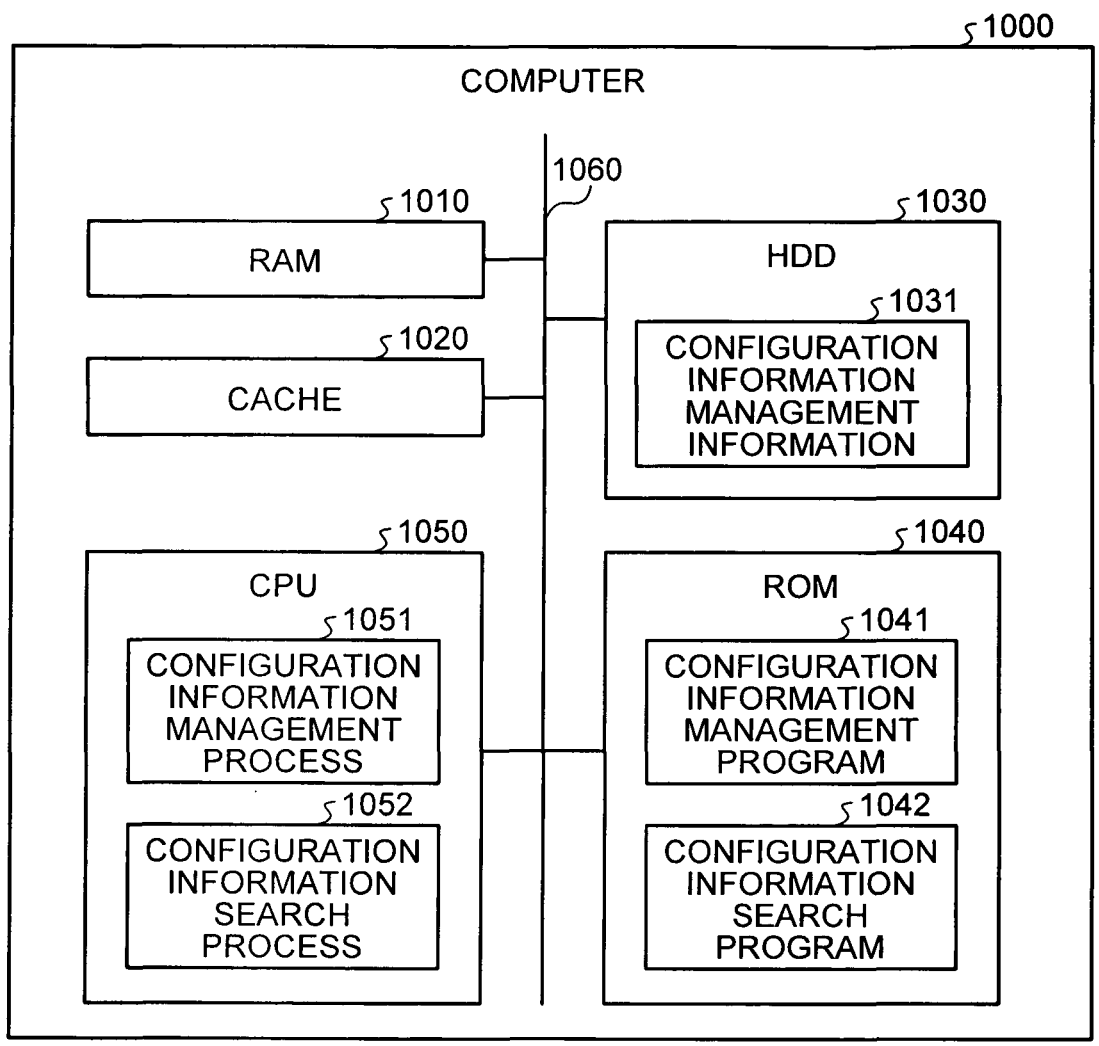
FIG. 23 is a diagram illustrating a computer that executes a configuration information management program.
Figure 24:
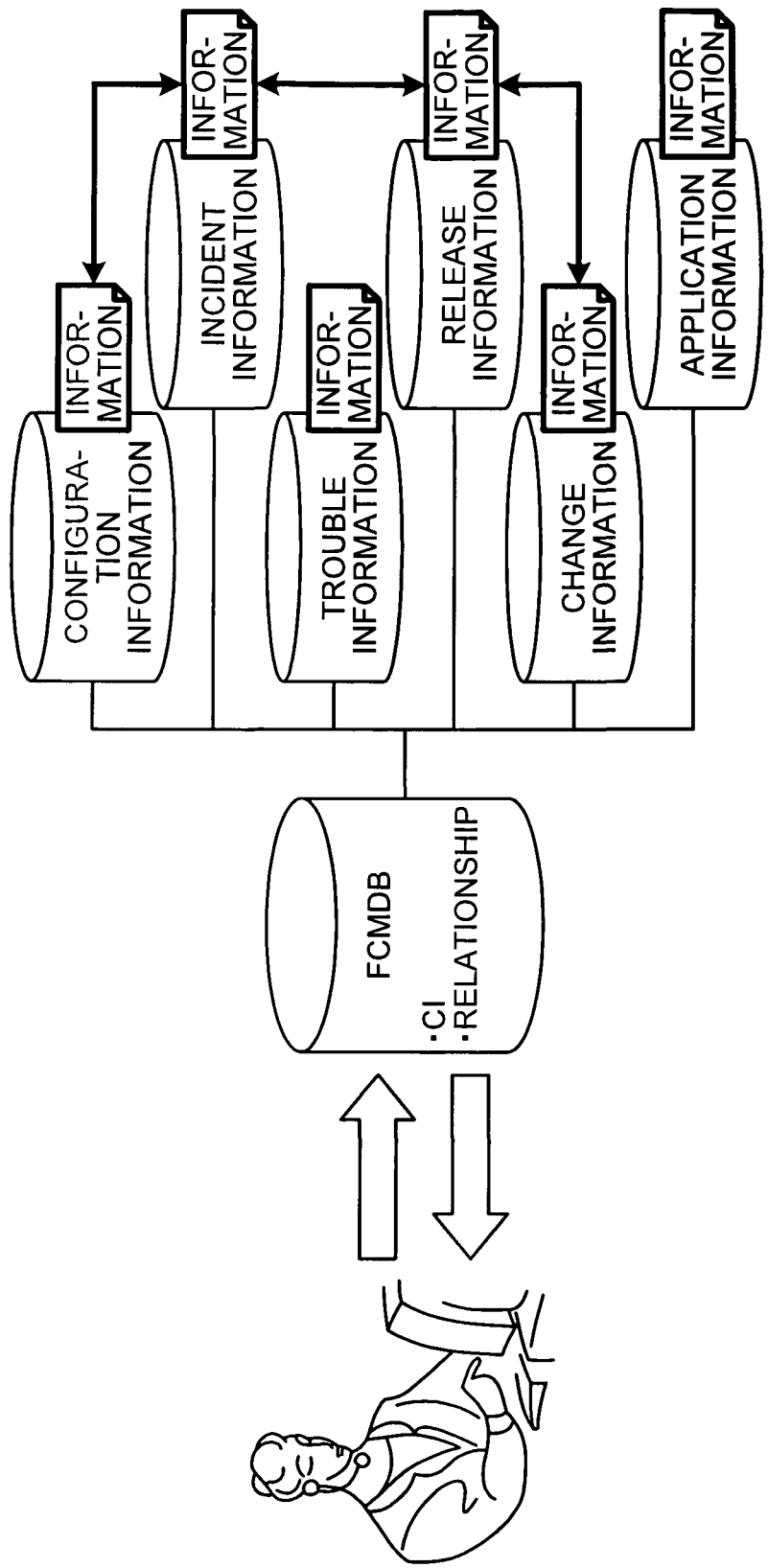
FIG. 24 is a related art diagram for explaining the concept of a FCMDB.
Figure 25:
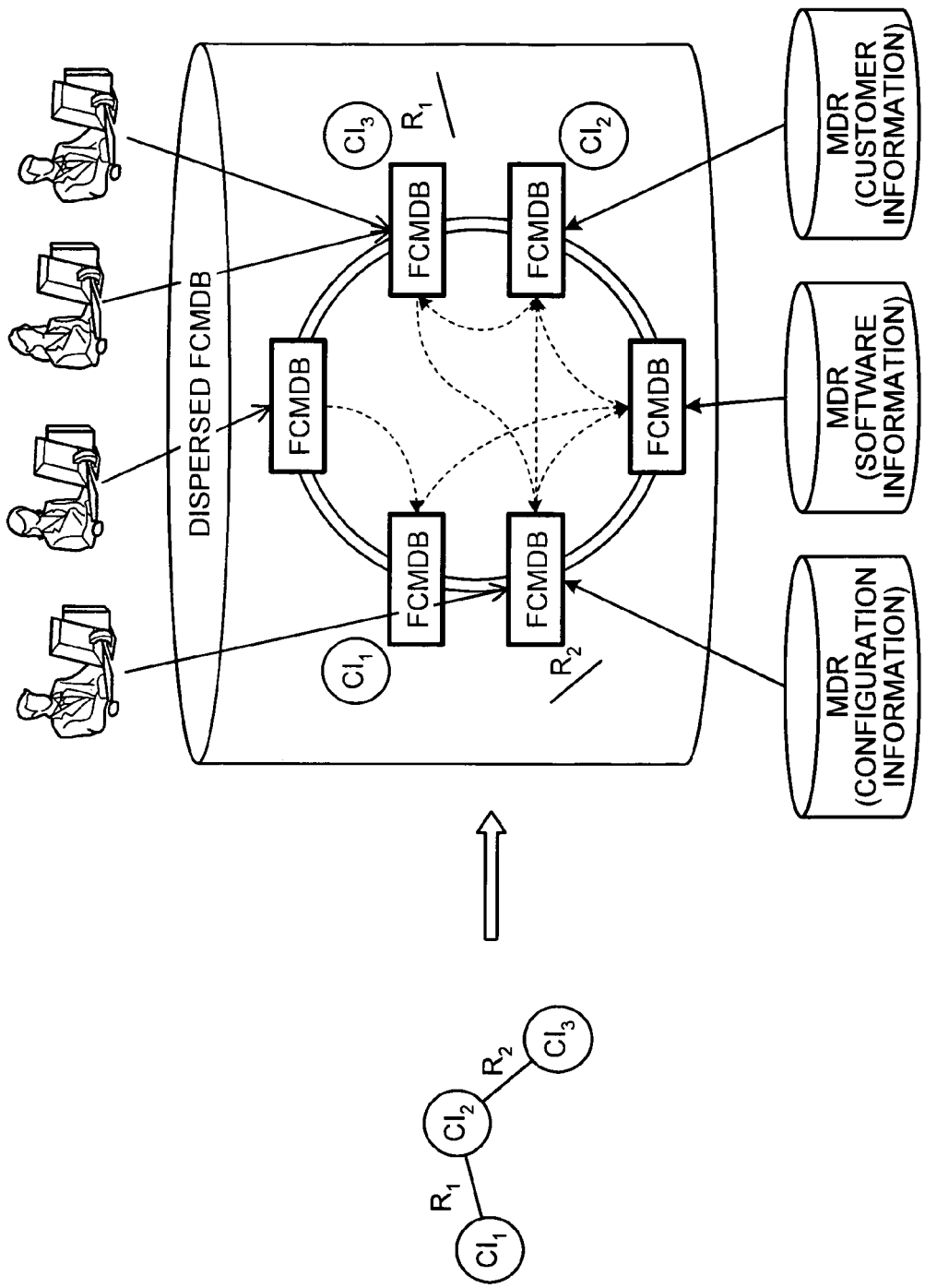
FIG. 25 is a related art diagram for explaining the concept of a distributed FCMDB.
Figure 26:
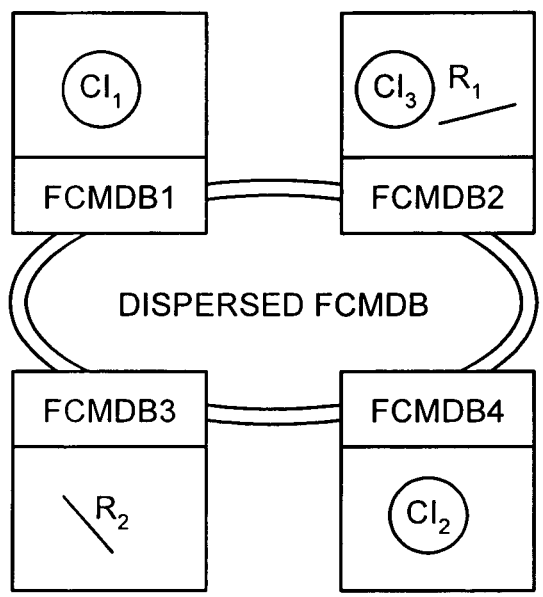
FIG. 26 is a related art diagram for explaining the search operation of the distributed FCMDB.

Also, the various kinds of operations described in the above embodiments can be realized by a computer such as a personal computer or a workstation that executes a program prepared in advance. Referring now to FIG. 23, an example of a computer that executes a configuration information management program having the same functions as the configuration information management device 2 illustrated in FIG. 3 is described.

FIG. 23 is a diagram illustrating a computer that executes a configuration information management program. As illustrated in FIG. 23, a computer 1000 includes a Random Access Memory (RAM) 1010, a cache 1020, a HDD 1030, a Read Only Memory (ROM) 1040, a Central Processing Unit (CPU) 1050, and a bus 1060. The RAM 1010, the cache 1020, the HDD 1030, the ROM 1040, and the CPU 1050 are connected by the bus 1060.

The configuration information management program having the same functions as the configuration information management device 2 illustrated in FIG. 3 is stored in the ROM 1040 in advance. Specifically, a configuration information management program 1041 and a configuration information search program 1042 are stored in the ROM 1040.

The CPU 1050 reads and executes the configuration information management program 1041 and the configuration information search program 1042. As a result, the configuration information management program 1041 turns into a configuration information management process 1051, and the configuration information search program 1042 turns into a configuration information search process 1052, as illustrated in FIG. 23. It is noted that the configuration information management process 1051 is equivalent to the management unit 20 illustrated in FIG. 2, and the configuration information search process 1052 is equivalent to the search unit 30 illustrated in FIG. 2.

Also, configuration information management information 1031 is provided in the HDD 1030, as illustrated in FIG. 23. The configuration information management information 1031 is equivalent to various kinds of data (the entity information storage unit 11 and the feature information storage unit 12) stored in the storage unit 10 illustrated in FIG. 3.

The above described programs 1041 and 1042 may not necessarily be stored in the ROM 1040. For example, the programs 1041 and 1042 may be stored in a "portable physical medium" inserted in the computer 1000, such as a flexible disk (FD), a CD-ROM, a MO disk, a DVD disk, a magnetooptic disk, or an IC card. Alternatively, the programs 1041 and 1042 may be stored in a "fixed physical medium" such as a hard disk drive (HDD) provided inside or outside the computer 1000. Further, the programs 1041 and 1042 may be stored in "another computer (or server)" connected to the computer 1000 via a public line, the Internet, a LAN, a WAN, or the like. The computer 1000 may read each program from the above described flexible disk or the like, and then execute the program.

According to an embodiment of a configuration information management device disclosed in the present invention, a search operation can be performed advantageously at a high speed even by tracing the relationships with configuration items (CIs).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A configuration information management device including:
   a storage unit that stores a configuration item managed by the device and an item relationship, with respect to configuration items related to a system and item relationships that associate the configuration items with one another, the configuration items and the item relationships being distributed in a plurality of devices;
   a management unit, executed by at least one processor, when a first configuration item stored in the storage unit has a feature, creates duplicates of second configuration items which do not have the feature and are managed by other devices, the second configuration items being associated with the first configuration item, and duplicates of relationships between the first configuration item and the second configuration items, the duplicates being created in the storage unit, the management unit including
      a registration unit that, upon receipt of a request for registration of configuration information, registers the configuration items and the item relationships contained in the configuration information in the storage units of the devices that manage the respective configuration items and the item relationships,
      a feature existence determining unit that determines whether the feature exists, based on the average attribute number of the configuration items belonging to the same item classification as the first configuration item contained in the configuration information, the feature existence determining unit calculating the average attribute number from the total attribute number obtained by adding up the attribute numbers of all the configuration items belonging to the same item classification as the first configuration item, and
      a duplicate creating unit that creates the duplicates of the second configuration items that are associated with the first configuration item in the configuration information and duplicates of item relationships between the configuration items, the duplicates being created in the storage unit of the device that manages the first configuration item; and
   a search unit that, upon receipt of a search request for configuration information that associates the configuration items with one another by the item relationships, searches for the information about the configuration information with the use of the duplicates created in the storage unit.

2. The configuration information management device according to claim 1, wherein
   the management unit includes a determining unit that determines whether the feature existence column of the first configuration item contained in the configuration information has changed, and the duplicate creating unit includes
a duplicate updating unit that, when the determining unit determines that the feature existence column of the first configuration item has changed, updates the duplicates of the configuration items that are already stored in the storage unit and classified in the same item classification as the first configuration item, based on the result of the change.

3. The configuration information management device according to claim 1, wherein the duplicate creating unit creates duplicates of the second configuration items associated with the first configuration item and duplicates of the item relationships between the first configuration item and the second configuration items, the duplicates being created in the device corresponding to a hash value calculated from a character identifying the first configuration item.

4. A computer-readable non-transitory recording medium that stores therein a computer program, that causes a computer to execute:
creating duplicates of second configuration items which do not have a feature and are managed by other devices, the second configuration items being associated with a first configuration item, and duplicates of relationships between the first configuration item and the second configuration items when the first configuration item has the feature, the configuration items and the item relationships being distributed in a plurality of devices, the creating including
registering, upon receipt of a request for registration of configuration information, the configuration items and the item relationships contained in the configuration information in storage units of the devices that manage the respective configuration items and the item relationships,
determining whether the feature exists, based on the average attribute number of the configuration items belonging to the same item classification as the first configuration item contained in the configuration information, the determining including calculating the average attribute number from the total attribute number obtained by adding up the attribute numbers of all the configuration items belonging to the same item classification as the first configuration item, and
creating the duplicates of the second configuration items that are associated with the first configuration item in the configuration information and the duplicates of item relationships between the configuration items, the duplicates being created in the storage unit of the device that manages the first configuration item; and
searching for the information about the configuration information with the use of the duplicates created in a device upon receipt of a search request for configuration information that associates the configuration items with one another by the item relationships.

5. A configuration information management method including:
creating duplicates of second configuration items which do not have a feature and are managed by other devices, the second configuration items being associated with a first configuration item, and duplicates of relationships between the first configuration item and the second configuration items when the first configuration item has the feature, the configuration items and the item relationships being distributed in a plurality of devices, the creating including
registering, upon receipt of a request for registration of configuration information, the configuration items and the item relationships contained in the configuration information in storage units of the devices that manage the respective configuration items and the item relationships,
determining whether the feature exists, based on the average attribute number of the configuration items belonging to the same item classification as the first configuration item contained in the configuration information, the determining including calculating the average attribute number from the total attribute number obtained by adding up the attribute numbers of all the configuration items belonging to the same item classification as the first configuration item, and
creating the duplicates of the second configuration items that are associated with the first configuration item in the configuration information and the duplicates of item relationships between the configuration items, the duplicates being created in the storage unit of the device that manages the first configuration item; and
searching for the information about the configuration information with the use of the duplicates created in a device upon receipt of a search request for configuration information that associates the configuration items with one another by the item relationships.

6. A configuration information management device comprising:
a processor; and
a memory that stores a configuration item managed by the device and an item relationship, with respect to configuration items related to a system and item relationships that associate the configuration items with one another, the configuration items and the item relationships being distributed in a plurality of devices, wherein the processor executes:
creating duplicates of second configuration items which do not have a feature and are managed by other devices, the second configuration items being associated with a first configuration item, and duplicates of relationships between the first configuration item and the second configuration items when the first configuration item has the feature, the configuration items and the item relationships being distributed in a plurality of devices, the creating including
registering, upon receipt of a request for registration of configuration information, the configuration items and the item relationships contained in the configuration information in storage units of the devices that manage the respective configuration items and the item relationships,
determining whether the feature exists, based on the average attribute number of the configuration items belonging to the same item classification as the first configuration item contained in the configuration information, the determining including calculating the average attribute number from the total attribute number obtained by adding up the attribute numbers of all the configuration items belonging to the same item classification as the first configuration item, and
creating the duplicates of the second configuration items that are associated with the first configuration item in the configuration information and the duplicates of item relationships between the configuration items, the duplicates being created in the storage unit of the device that manages the first configuration item; and
searching for the information about the configuration information with the use of the duplicates created in the storing upon receipt of a search request for configuration information that associates the configuration items with one another by the item relationships.

\* \* \* \* \*